(12) United States Patent
Sugaya

(10) Patent No.: US 11,277,228 B2
(45) Date of Patent: *Mar. 15, 2022

(54) INFORMATION PROCESSING DEVICE, COMMUNICATION SYSTEM, INFORMATION PROCESSING METHOD, AND PROGRAM

(71) Applicant: Sony Corporation, Tokyo (JP)

(72) Inventor: Shigeru Sugaya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 5 days.

This patent is subject to a terminal disclaimer.

(21) Appl. No.: 16/879,770

(22) Filed: May 21, 2020

(65) Prior Publication Data

US 2020/0287662 A1 Sep. 10, 2020

Related U.S. Application Data

(63) Continuation of application No. 15/559,893, filed as application No. PCT/JP2016/051785 on Jan. 22, 2016.

(30) Foreign Application Priority Data

Apr. 27, 2015 (JP) .............................. JP2015-090552

(51) Int. Cl.
*H04L 1/00* (2006.01)
*H04L 1/08* (2006.01)
(Continued)

(52) U.S. Cl.
CPC .............. *H04L 1/08* (2013.01); *H04L 1/1809* (2013.01); *H04L 1/1854* (2013.01);
(Continued)

(58) Field of Classification Search
CPC ....... H04L 1/08; H04L 1/1896; H04L 1/1867; H04L 1/1809; H04L 1/1854; H04L 29/08;
(Continued)

(56) References Cited

U.S. PATENT DOCUMENTS 5,553,083 A * 9/1996 Miller ................... H04L 1/1614
714/748
5,727,002 A * 3/1998 Miller ................... H04L 1/1614
709/237

(Continued)

FOREIGN PATENT DOCUMENTS

EP 0 804 838 A2 11/1997
EP 1 185 033 A1 3/2002
(Continued)

OTHER PUBLICATIONS

Communication Pursuant to Article 94(3) EPC dated Mar. 6, 2020 in European Application No. 16 786 161.6-1205.

(Continued)

*Primary Examiner* — Albert Decady
*Assistant Examiner* — Osman M Alshack
(74) *Attorney, Agent, or Firm* — Xsensus LLP

(57) ABSTRACT

Wireless transmission paths are utilized efficiently. An information processing device includes a control section. If data destined for the own device is received from another device and if there exists undelivered data in the data, the control section performs control to transmit a retransmission request for the data to the other device. If there exists no undelivered data in the data destined for the own device and received from the other device, the control section performs control not to transmit a confirmation of reception.

10 Claims, 20 Drawing Sheets

(51) Int. Cl.
 *H04W 28/04* (2009.01)
 *H04L 65/40* (2022.01)
 *H04W 84/12* (2009.01)
 *H04L 1/18* (2006.01)
 *H04L 1/16* (2006.01)

(52) U.S. Cl.
 CPC .......... *H04L 1/1867* (2013.01); *H04L 1/1896* (2013.01); *H04L 29/08* (2013.01); *H04W 28/04* (2013.01); *H04W 84/12* (2013.01); H04L 1/1657 (2013.01); H04L 1/1692 (2013.01); H04L 1/1874 (2013.01); H04L 2001/0093 (2013.01)

(58) Field of Classification Search
 CPC .......... H04L 1/1692; H04L 2001/0093; H04L 1/1874; H04L 1/1657; H04L 12/5875; H04W 84/12; H04W 28/04
 USPC .................................................. 714/748–750
 See application file for complete search history.

(56) References Cited

U.S. PATENT DOCUMENTS

| | | |
|---|---|---|
| 6,574,668 B1 | 6/2003 | Gubbi |
| 2002/0028687 A1* | 3/2002 | Sato ............... H04L 1/1678 455/466 |
| 2004/0170152 A1* | 9/2004 | Nagao ............ H04L 1/0054 370/338 |
| 2005/0030965 A1 | 2/2005 | Aoki et al. |
| 2005/0249231 A1 | 11/2005 | Khan |
| 2006/0256740 A1* | 11/2006 | Koski .............. H04L 12/1863 370/278 |
| 2008/0031177 A1* | 2/2008 | Lee ............... H04L 1/0002 370/312 |
| 2008/0031178 A1 | 2/2008 | Vilei et al. |
| 2008/0056173 A1* | 3/2008 | Watanabe ........ H04L 1/1829 370/315 |
| 2008/0133996 A1* | 6/2008 | Naka ............... H04L 1/1887 714/748 |
| 2008/0137689 A1* | 6/2008 | Shiizaki .......... H04L 47/10 370/498 |
| 2008/0222478 A1* | 9/2008 | Tamaki ............ H04L 1/18 714/749 |
| 2009/0044065 A1* | 2/2009 | She ............... H04L 1/1819 714/748 |
| 2009/0210766 A1* | 8/2009 | Katayama ......... H04L 5/0044 714/748 |
| 2009/0257377 A1 | 10/2009 | Vedantham |
| 2010/0138715 A1* | 6/2010 | Motoyoshi ........ H04B 7/043 714/749 |
| 2011/0199975 A1* | 8/2011 | Wu ............... H04W 72/0406 370/328 |
| 2011/0264977 A1 | 10/2011 | Chen |

FOREIGN PATENT DOCUMENTS

| | | |
|---|---|---|
| GB | 2 287 383 A | 9/1995 |
| JP | 10-215294 A | 8/1998 |
| JP | 10-512726 A | 12/1998 |
| JP | 2001-333134 A | 11/2001 |
| JP | 2004-350088 A | 12/2004 |
| JP | 2005-57373 A | 3/2005 |
| JP | 2005-86398 A | 3/2005 |
| JP | 2005-260939 A | 9/2005 |
| JP | 2009-055246 A | 3/2009 |
| JP | 2009282627 A | 12/2009 |
| JP | 2015012471 A | 1/2015 |
| JP | 2015-226073 A | 12/2015 |
| WO | 2008/012789 A1 | 1/2008 |

OTHER PUBLICATIONS

Notification of Reasons for Refusal issued in Japanese Application 2017-515396 dated Jan. 14, 2020.
Hirakawa, T., et al., "Two Simple Modifications for Improving IEEE802.11DCF Throughput Performance", [NAV Timer Reduction in RTS/CTS Mechanism of IEEE802. IIDCF and Effect of ACK Packet Omission], Research Report of Information Processing Society of Japan, vol. 2003, No. 113, 9 Pages total, (Nov. 13, 2003) (English Abstract only).
Extended European Search Report dated Dec. 3, 2018, issued in European Application No. 16786161.
International Search Report dated Mar. 29, 2016 in PCT/JP2016/051785 filed Jan. 22, 2016.

* cited by examiner

COMMUNICATION SYSTEM
10

STRUCTURE EXAMPLE OF RTS FRAME

STRUCTURE EXAMPLE OF CTS FRAME

STRUCTURE EXAMPLE OF NAQ FRAME

STRUCTURE EXAMPLE OF AGGREGATED DATA FRAME

SETTING EXAMPLE OF Type Field AND Subtype Field

| FRAME KIND | Type | Subtype | Description |
|---|---|---|---|
| RTS FRAME | 01 | 0011 | Zero-ACK Request to Send |
| CTS FRAME | 01 | 0100 | Zero-ACK Cleat to Send |
| NAQ FRAME | 01 | 0101 | Zero-ACK Retransmission Request |

COMMUNICATION EXAMPLE OF AGGREGATED DATA a b

INFORMATION PROCESSING DEVICE, COMMUNICATION SYSTEM, INFORMATION PROCESSING METHOD, AND PROGRAM

CROSS-REFERENCE TO RELATED APPLICATIONS

The present application is a continuation of U.S. application Ser. No. 15/559,893, filed Sep. 20, 2017, which is based on PCT filing PCT/JP2016/051785, filed Jan. 22, 2016, which claims priority to JP 2015-090552, filed Apr. 27, 2015, the entire contents of each are incorporated herein by reference.

TECHNICAL FIELD

The present technology relates to an information processing device. More particularly, the technology relates to an information processing device, a communication system, and an information processing method for transmitting and receiving data using wireless communication, as well as to a program for causing a computer to execute the information processing method.

BACKGROUND ART

There exist wireless communication techniques for transmitting and receiving data using wireless communication. For example, there have been proposed communication methods for transmitting and receiving data between information processing devices using a wireless local area network (LAN).

Where data is transmitted and received using the wireless LAN, the device of the transmission source receives a confirmation of reception (e.g., Acknowledgement (ACK)) from the device of the transmission destination. This allows the source device to ascertain that reception of the transmitted data by the destination device is completed. Also, receiving the confirmation of the reception enables the source device to discard from its buffer the data that was transmitted to the destination device.

The Institute of Electrical and Electronics Engineers (IEEE) 802.11 standard discloses frame aggregation techniques for aggregating multiple items of data and transmitting the aggregated data in a single burst. For data transmission sequences of the frame aggregation, techniques are provided to identify the data to be retransmitted upon receipt of a single confirmation of reception (Block ACK (BACK)) for multiple data items transmitted.

In recent years, techniques have been proposed for transmitting data in a single burst to multiple destination devices (e.g., techniques of frame aggregation for multiple users). Also proposed are techniques for applying the multi-user frame aggregation techniques to multiple-input multiple-output (MIMO) techniques. The techniques are then used to multiplex signals by multiplying by a coefficient each of multiple antenna elements addressed to multiple users.

Also proposed are sequences in which a non-delivery notification (Negative Acknowledgement (NACK)) identifying undelivered data is exchanged on a stably connected transmission network (e.g., a wired transmission network).

For example, there is proposed a technique (e.g., see PTL 1) for returning NACK so as to have the transmitted data retransmitted if the data transmission from the transmission source to the transmission destination fails.

CITATION LIST

Patent Literature

[PTL 1]
JP 2005-260939 A

SUMMARY

Technical Problems

According to the above-mentioned existing techniques, the source device recognizes that data reception is complete upon receipt of a confirmation of reception (ACK). Thus if a confirmation of reception (ACK) has yet to be received, the source device retransmits the data to the destination device in accordance with a predetermined procedure. However, where the source device does not receive the confirmation of reception (ACK) even if the destination device has received the data correctly, the source device starts retransmitting the data.

As another example, if BACK including multiple data items is not received through frame aggregation, it might happen that all data items that have been correctly received by the destination device are retransmitted by the source device. In this case, the unnecessary data retransmission needlessly occupies wireless transmission paths for an extended period of time, potentially making it difficult to efficiently use the wireless transmission paths.

If the non-delivery notification (NACK) is in use but the source device does not receive it, the data involved is discarded. Thus if the source device fails to receive the non-delivery notification (NACK) that was nevertheless transmitted by the destination device, the data is discarded. This raises the possibility that the data may never reach the destination device.

The multi-user frame aggregation techniques involve getting the source device to transmit a request for confirmation of reception (BACK request) to each of multiple destination devices after transmitting data thereto so that the source device will receive a confirmation of reception (ACK) from each destination device. The source device needs to receive the confirmation of reception (ACK) following every data transmission. This can prolong the time required to collect the confirmations of reception from multiple destination devices, which potentially makes it difficult to efficiently use the wireless transmission paths.

Also according to the above-described existing techniques, the non-delivery notification (NACK) is used as a retransmission request. The retransmission request is continued until the device of the data transmission source receives ACK signifying successful data reception. This prolongs the time required for data transmission and reception, which potentially makes it difficult to efficiently use the wireless transmission paths.

The present technology has been conceived in view of the above circumstances. An object of the technology is therefore to use wireless transmission paths efficiently.

Solution to Problems

The present technology has been devised to solve the above problems. According to a first aspect of the present technology, there are provided an information processing device, an information processing method for use with the device, and a program for causing a computer to execute the method, the information processing device including a control section configured in such a manner that if data destined for the own device is received from another device and if there exists undelivered data in the data, the control section transmits a retransmission request for the data to the other device and that if there exists no undelivered data in the data, the control section performs control not to transmit a confirmation of reception. This provides an effect such that if data destined for the own device is received from another device and if there exists undelivered data in the data, a retransmission request for the data is transmitted to the other device and that if there exists no undelivered data in the data, a confirmation of reception is not transmitted.

Also according to the first aspect, if there exists the undelivered data, the control section may transmit a retransmission request for the undelivered data to the other device. This provides an effect of transmitting the retransmission request for the undelivered data to the other device if there exists the undelivered data.

Also according to the first aspect, if first undelivered data constituting the undelivered data corresponding to the retransmission request is not transmitted from the other device following the transmission of the retransmission request, if new data destined for the own device is received from the other device, and if there exists undelivered data in the new data, the control section may transmit to the other device a retransmission request for the new data including information about the first undelivered data. This provides an effect such that if the undelivered data (first undelivered data) corresponding to the retransmission request following its transmission is not transmitted from the other device, if new data destined for the own device is received from the other device, and if there exists undelivered data in the new data, a retransmission request for the new data including information about the first undelivered data is transmitted to the other device.

Also according to the first aspect, the data destined for the own device may have multiple data items combined by the other device to make up aggregated data. If there exists undelivered data in the aggregated data, the control section may transmit a retransmission request for part or all of the aggregated data to the other device. This provides an effect such that if there exists undelivered data in the aggregated data, a retransmission request for part or all of the aggregated data is transmitted to the other device.

Also according to the first aspect, the data destined for the own device may have multiple data items combined by the other device to make up aggregated data. The aggregated data may be destined for multiple devices including the information processing device. This provides an effect such that multiple data items making up the aggregated data and destined for multiple devices are received thereby.

Also according to the first aspect, the control section may set a timing for transmitting the retransmission request to the other device in a manner backing off from a transmission timing of the retransmission request communicated from the other device. This provides an effect of setting the timing for transmitting the retransmission request to the other device in a manner backing off from the transmission timing of the retransmission request communicated from the other device.

Also according to the first aspect, even if a reception buffer section configured to hold data destined for the own device does not have at least a predetermined free space, the control section may perform control to transmit the retransmission request to the other device. This provides an effect of transmitting the retransmission request to the other device even if the reception buffer section for holding data destined for the own device does not have at least a predetermined free space.

Also according to the first aspect, the control section may perform the control after verifying that the data destined for the own device is transmitted from the other device following exchange of a transmission request and a confirmation of transmission with the other device. This provides an effect of performing the control after verifying that the data destined for the own device is transmitted from the other device following exchange of a transmission request and a confirmation of transmission with the other device.

According to a second aspect of the present technology, there are provided an information processing device, an information processing method for use with the device, and a program for causing a computer to execute the method, the information processing device including a control section configured in such a manner that if aggregated data combining multiple data items is transmitted to a destination device and if a retransmission request for the aggregated data is received from the destination device, the control section performs control to collectively transmit undelivered data in the data items corresponding to the retransmission request to the device. This provides an effect such that if aggregated data is transmitted to the destination device and if a retransmission request for the aggregated data is received from the destination device, the undelivered data in the data items corresponding to the retransmission request are collectively transmitted to the device.

Also according to the second aspect, the control section may set a transmission timing of the retransmission request to be transmitted from the device if undelivered data exists in the aggregated data, the control section communicating the transmission timing to the device using a transmission request to be transmitted to the device before the transmission of the aggregated data. This provides an effect of setting the transmission timing of the retransmission request and communicating the transmission timing to the device using a transmission request before the transmission of the aggregated data.

Also according to the second aspect, in transmitting the aggregated data to multiple devices, the control section may set the transmission timing of the retransmission request to be transmitted from the devices if there exists undelivered data in the aggregated data, on the basis of a number fewer than the number of the devices. This provides an effect such that when the aggregated data is transmitted to multiple devices, the transmission timing of the retransmission request is set on the basis of a number fewer than the number of the devices.

Also according to the second aspect, upon detecting a signal of which reception field intensity is higher than a threshold value at the transmission timing of the retransmission request, the control section may perform control to retransmit all the aggregated data as the undelivered data. This provides an effect such that upon detection of a signal whose reception field intensity is higher than a threshold value at the transmission timing of the retransmission request, all the aggregated data are retransmitted as the undelivered data.

Also according to the second aspect, even if the retransmission request is not received, the control section may hold the aggregated data transmitted to the device over a time period predetermined on the basis of the transmission timing of the retransmission request. This provides an effect such that even if the retransmission request is not received, the aggregated data transmitted to the device is held over a time period predetermined on the basis of the transmission timing of the retransmission request.

Also according to the second aspect, if the retransmission request is not received, the control section may transmit to the device other aggregated data to be transmitted thereto. This provides an effect of transmitting to the device other aggregated data to be transmitted thereto if the retransmission request is not received.

According to a third aspect of the present technology, there are provided a communication system, an information processing method for use with the system, and a program for causing a computer to execute the method, the communication system including a first information processing device and a second information processing device. If data destined for the second information processing device is transmitted thereto and if a retransmission request for the data is received from the second information processing device, the first information processing device collectively transmits undelivered data in the data corresponding to the retransmission request to the second information processing device. If data destined for the own device is received from the first information processing device and if there exists undelivered data in the data, the second information processing device transmits a retransmission request for the data to the first information processing device, the second information processing device withholding transmission of a confirmation of reception if there exists no undelivered data in the data. This provides an effect such that if data destined for the second information processing device is transmitted thereto and if a retransmission request for the data is received from the second information processing device, the first information processing device collectively transmits undelivered data in the data corresponding to the retransmission request to the second information processing device and that if data destined for the own device is received from the first information processing device and if there exists undelivered data in the data, the second information processing device transmits a retransmission request for the data to the first information processing device, the second information processing device withholding transmission of a confirmation of reception if there exists no undelivered data in the data.

Advantageous Effects of Invention

The present technology provides the effect of allowing wireless transmission paths to be used efficiently. The advantageous effects outlined above are not limitative of the present disclose. Further advantages of the disclosure will be apparent from the ensuing description.

DESCRIPTION OF EMBODIMENTS

Described below are the preferred modes for implementing the present technology (called the embodiments hereunder). The description will be given under the following headings:

1. Embodiments (examples of performing retransmission control with a confirmation of reception omitted)

2. Applications

1. Embodiments (Configuration Example of Communication System)

Figure 1:
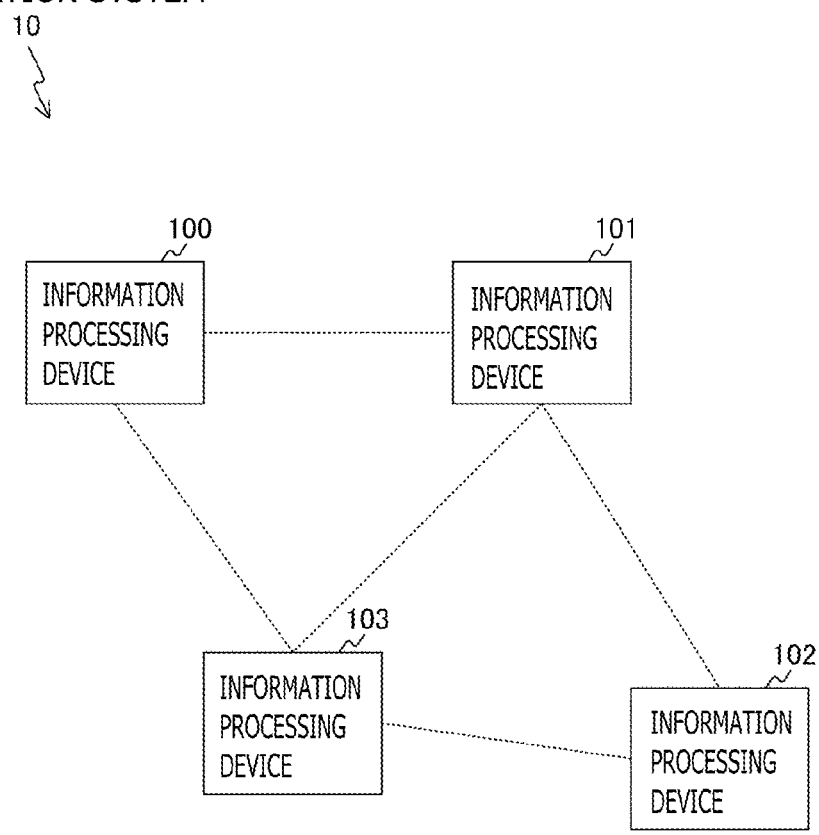
FIG. 1 is a schematic diagram depicting a configuration example of a wireless network constituted by a communication system 10 embodying the present technology.

FIG. 1 is a schematic diagram depicting a configuration example of a wireless network constituted by a communication system 10 embodying the present technology. In FIG. 1, four information processing devices 100 to 103 make up the communication system 10 forming the wireless network.

For example, the information processing devices 100 to 103 may each be a stationary or a mobile information processing device having a wireless communication function. The stationary information processing device may be an access point or a base station of a wireless local area network (LAN) system, for example. The mobile information processing device may be a smartphone, a cellphone, or a tablet terminal, for example.

The information processing devices 100 to 103 are each assumed to have the communication function supporting wireless LAN standards under the Institute of Electrical and Electronics Engineers (IEEE) 802.11, such as the wireless LAN standards under the IEEE 802.11ax. Alternatively, Wireless Fidelity (Wi-Fi), Wi-Fi Direct, or Wi-Fi CERTI-FIED Miracast specifications (technical specification name: Wi-Fi Display) may be used for the wireless LAN. In another alternative, wireless communication may be performed using some other suitable communication method.

For example, the communication system 10 may constitute a network in which multiple devices communicate wirelessly with each other on a one-to-one basis so as to be interconnected (e.g., making up a mesh network or ad-hoc network). The communication system 10 may be used in the mesh network under the IEEE 802.11s, for example.

As another example, the communication system 10 may constitute a network made up of an access point (master station) and subordinate devices (slave stations). If the information processing device 103 acts as the access point, the information processing devices 100 to 102 may serve as subordinate devices to that access point (information processing device 103).

In FIG. 1, the devices that can directly communicate with each other wirelessly are depicted connected by dotted lines. Specifically, the information processing device 100 can communicate with the information processing devices 101 and 103. The information processing device 101 can communicate with the information processing devices 100, 102 and 103. The information processing device 102 can communicate with the information processing devices 101 and 103. The information processing device 103 can communicate with the information processing devices 100, 101 and 102.

In the embodiment of the present technology, the operations of the source device (transmitting-side device) and those of the destination device (receiving-side device) will be described separately for purpose of explanation. It is to be noted that the functions of the two device types may be incorporated in a single device or that the function of either of the two device types may be provided by one device.

The system configuration addressed by the embodiment of the present technology is not limited to what was described above. For example, whereas FIG. 1 depicts a typical communication system made up of four information processing devices, the number of the configured information processing devices is not limited to four. The way the multiple information processing devices are connected with one another is not limited to any of the above-mentioned connection modes. For example, the embodiment of the present technology may be applied to a network that has multiple devices connected with each other in a manner different from any of the above-mentioned connection modes.

(Configuration Example of Information Processing Device)

Figure 2:
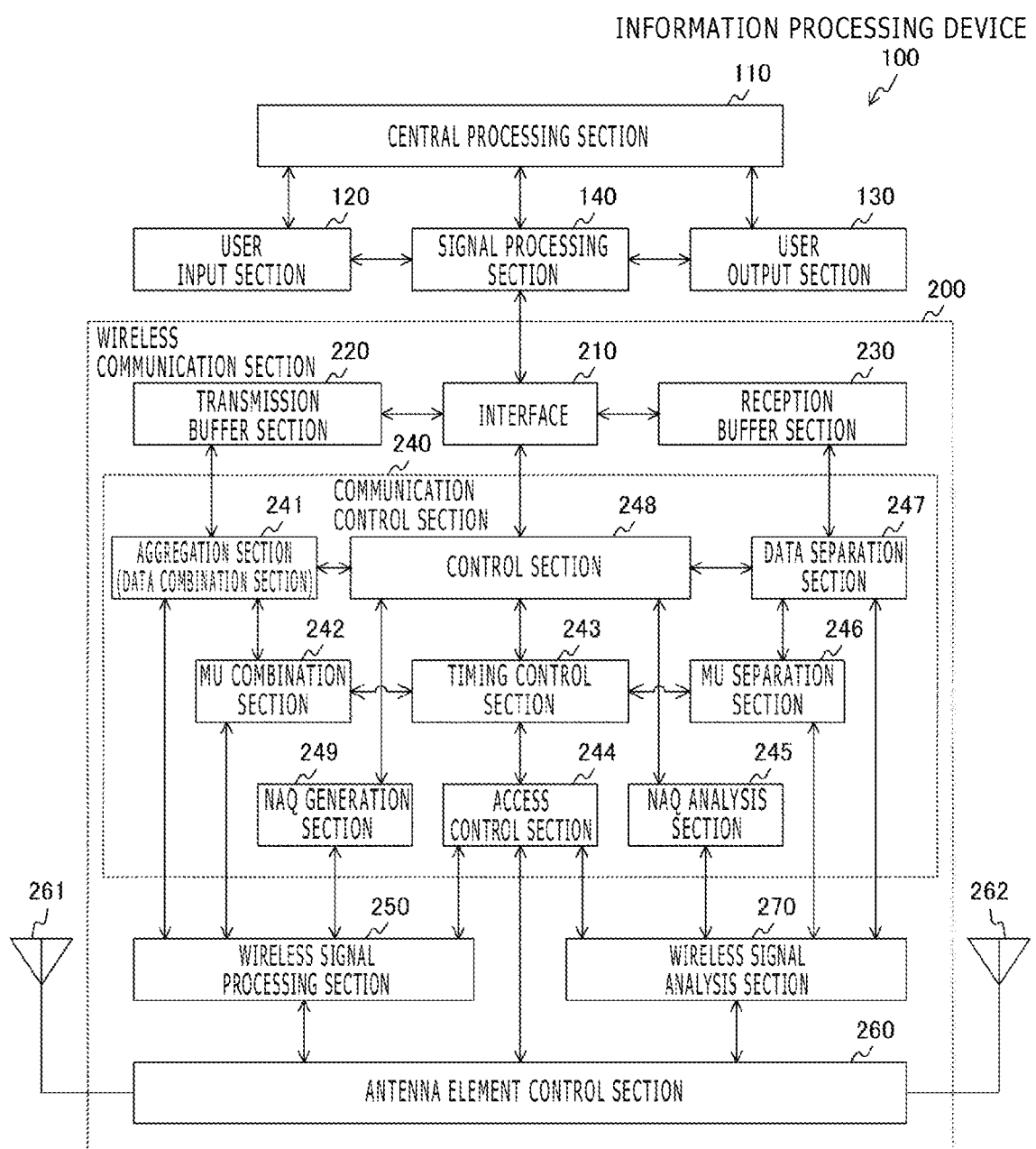
FIG. 2 is a block diagram depicting a functional configuration example of an information processing device 100 embodying the present technology.

FIG. 2 is a block diagram depicting a functional configuration example of the information processing device 100 embodying the present technology. The functional configuration of the information processing devices 101 to 103 is approximately the same as that of the information processing device 100 and thus will not be discussed further.

The information processing device 100 includes a central processing section 110, a user input section 120, a user output section 130, a signal processing section 140, and a wireless communication section 200.

The central processing section 110 operates the information processing device 100 by controlling its components. For example, the central processing section 110 acting as a central processing unit (CPU) causes the information processing device 100 to operate under control of an operating system (OS).

The user input section 120 is used to acquire diverse data. For example, the user input section 120 is constituted by operating members (e.g., keyboard, touch panel, etc.) for inputting the instructions of a user. As another example, the user input section 120 may be formed by an imaging element for generating image data and by an audio recording element for acquiring audio data.

The user output section 130 provides diverse data for the user. For example, the user output section 130 is constituted by a display unit for displaying visual image information, by speakers for giving such information as voice and music to the user, and by an output device for outputting the feel such as vibrations.

The signal processing section 140 performs diverse signal processing. For example, the signal processing section 140 converts information input from the user input section 120 or information output from the user output section 130 into electrical signals (or signals complying with a predetermined communication protocol).

The wireless communication section 200 has the function of performing wireless communication based on a predetermined wireless communication protocol. The wireless communication section 200 includes an interface 210, a transmission buffer section 220, a reception buffer section 230, a communication control section 240, a wireless signal processing section 250, an antenna element control section 260, antennas 261 and 262, and a wireless signal analysis section 270.

The communication control section 240 includes an aggregation section (data combination section) 241, a multi-user (MU) combination section 242, a timing control section 243, an access control section 244, a NAQ analysis section 245, a multi-user (MU) separation section 246, a data separation section 247, a control section 248, and a NAQ generation section 249.

The interface 210 connected with the signal processing section 140 is an interface that inputs information from the user input section 120 and outputs information to the user output section 130.

The transmission buffer section 220 is a buffer that holds data (e.g., user data) to be transmitted by the information processing device 100 to other devices.

The aggregation section (data combination section) 241 aggregates multiple data items in predetermined transmission units for transmission in a single burst.

The multi-user (MU) combination section 242 combines data destined for other devices as different (transmission) destinations by multiplexing the data using parameters that are orthogonal to each of the devices.

The timing control section 243 sets the timing for signal transmission based on a predetermined communication protocol, thereby controlling the timing for data transmission and reception.

The access control section 244 performs access control on the basis of a predetermined wireless communication protocol in such a manner that an attempt to access does not collide with signals transmitted from other devices over wireless transmission paths.

The wireless signal processing section 250 processes signals in a predetermined signal format of wireless communication in order to transmit wirelessly transmitted data information and control information such as NAQ (retransmission request, non-delivery notification, etc.) onto wireless communication media.

The antenna element control section 260 is connected with multiple antenna elements, and controls the individual antenna elements in such a manner that each of the elements is orthogonal to each of different destination devices.

The antennas 261 and 262 are a group of antennas connected with the antenna element control section 260 and the wireless signal processing section 250. These antennas are provided to output wireless signals onto the media.

The wireless signal analysis section 270 extracts predetermined signals transmitted via wireless communication media, before analyzing predetermined data information and such control information as a NAQ frame (NAQ signal) from the extracted signals. The NAQ frame is a signal for making a retransmission request. The NAQ frame will be discussed later in more detail with reference to FIG. 5.

If the received wireless communication signal is the NAQ frame, the NAQ analysis section 245 analyzes the received information to extract retransmission control parameters therefrom.

The multi-user (MU) separation section 246 receives multi-user data items destined for multiple different (transmission) destinations, and performs processing to extract only the data destined for the own device from the data items transmitted multiplexed in such a manner that each of the multiple data items is orthogonal to the corresponding user.

When multiple data items are transmitted aggregated in a burst, the data separation section 247 separates the aggregated data into individual data units, and determines whether or not each of the data units is received.

The reception buffer section 230 is a buffer that holds the data transmitted to the information processing device 100 from other devices.

The control section 248 controls the components of the communication control section 240. For example, if data destined for the own device is received from another device and if there exists any undelivered data in the received data, the control section 248 transmits to the other device a retransmission request for the undelivered data. If there exists no undelivered data in the received data, the control section 248 performs control not to transmit a confirmation of reception. The transmission request may be made using the NAQ frame, and the confirmation of reception may be given using Acknowledgement (ACK). If there exists the undelivered data, the control section 248 may perform control to transmit an undelivered data retransmission request to the other device.

If the data destined for the own device is an aggregate of multiple data items and if there exists any undelivered data in the aggregated data, the control section 248 may transmit to the other device a retransmission request for part or all of the aggregated data.

As another example, upon receipt of a retransmission request for aggregated data from the destination device to which an aggregate of multiple data items was transmitted, the control section 248 performs control to transmit to the destination device the undelivered data in the data items corresponding to the retransmission request. For example, the control section 248 determines the data to be retransmitted on the basis of the received retransmission request (NAQ frame), and acquires the retransmission data from the transmission buffer section 220. The control section 248 outputs the acquired retransmission data to the aggregation section (data combination section) 241 as need. At the same time, the control section 248 identifies the undelivered data from the received data to create NAQ information (information for generating the NAQ frame).

The NAQ generation section 249 identifies the data not delivered (undelivered data) from among the data known to be transmitted, and creates information about the undelivered data in the form of a NAQ frame.

(Structure Example of Request-to-Send (RTS) Frame)

Figure 3:
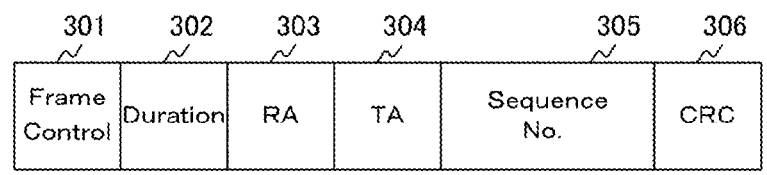
FIG. 3 is a schematic diagram depicting a structure example of a Request-to-Send (RTS) frame transmitted and received between devices in the embodiment.

FIG. 3 is a schematic diagram depicting a structure example of an RTS frame transmitted and received between devices in the embodiment. The RTS frame is a transmission request frame transmitted by the source device to the destination device when making a transmission request to the latter. The RTS frame also serves as a signal notifying that an ACK frame will not be transmitted if there exists no undelivered data in the subsequent data frame transmission.

The RTS frame depicted in FIG. 3 may be provided in a new frame format amenable to coexistence or parallel use with the existing communication protocol sequences. With this embodiment, however, the existing RTS frame may be used for control purposes.

The RTS frame is made up of a Frame Control field 301, a Duration field 302, a Receiver Address (RA) field 303, a Transmitter Address (TA) field 304, a Sequence No. field 305, and a Cyclic Redundancy Check (CRC) field 306.

Figures 6, 7:
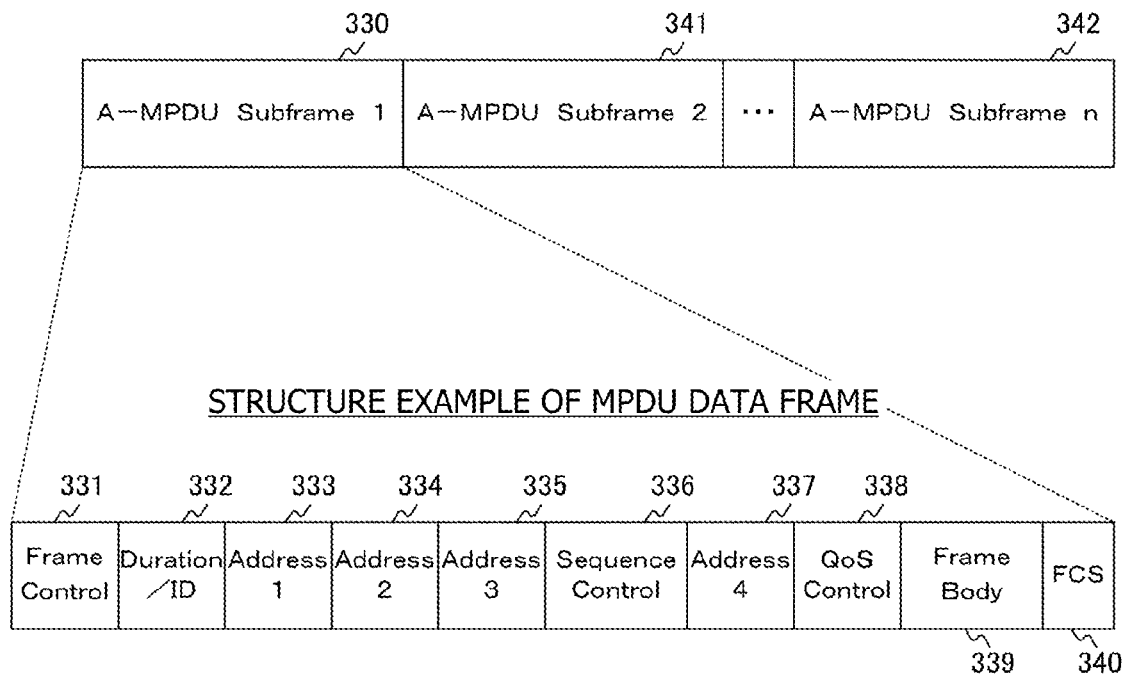
FIG. 6 is a schematic diagram depicting structure examples of an aggregated data frame and a Media Access Control (MAC) Protocol Data Unit (MPDU) data frame transmitted and received between devices in the embodiment.
FIG. 7 is a schematic diagram depicting setting examples of a Type field and a Subtype field in the frame transmitted and received between devices in the embodiment.

The Frame Control field 301 holds information indicating that this is a new RTS frame. FIG. 7 depicts description examples of a Type field and a Subtype field included in the Frame Control field 301.

The Duration field 302 holds information indicating the duration time of the RTS frame. For example, the duration time held in this frame may be from the time an RTS frame is transmitted until a NAQ frame is received.

The RA field 303 holds information indicating the address of the device of the transmission destination.

The TA field 304 holds information indicating the address of the device of the transmission source.

The Sequence No. field 305 holds information indicating the sequence number (i.e., the number held in a Sequence Control field 336 depicted in FIG. 6) of transmission data. If the transmission data is combined (aggregated) data, the Sequence No. field 305 holds information indicating the sequence number of the first data item in the combined data (i.e., the number held in the Sequence Control field 336 in FIG. 6).

The CRC field 306 holds information for use in error detection.

The elements described above are examples. Other elements may be added as needed.

(Structure Example of Clear-to-Send (CTS) Frame)

Figure 4:
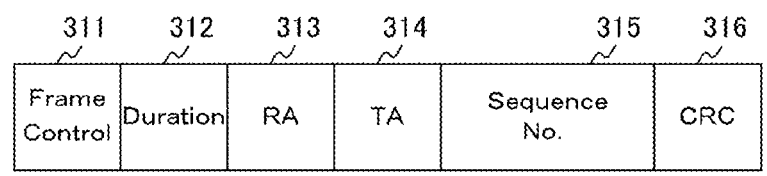
FIG. 4 is a schematic diagram depicting a structure example of a Clear-to-Send (CTS) frame transmitted and received between devices in the embodiment.

FIG. 4 is a schematic diagram depicting a structure example of a CTS frame transmitted and received between devices in the embodiment. The CTS frame is a frame for confirmation of transmission transmitted by the destination device to the source device to confirm the transmission. The CTS frame also serves as a signal notifying that the ACK frame will not be transmitted if there exists no undelivered data.

The CTS frame depicted in FIG. 4 may be provided in a new frame format amenable to coexistence or parallel use with the existing communication protocol sequences. With this embodiment, however, the existing CTS frame may be used for control purposes.

The CTS frame is made up of a Frame Control field 311, a Duration field 312, an RA field 313, a TA field 314, a Sequence No. field 315, and a CRC field 316. These elements correspond to those with the same names in the RTS frame depicted in FIG. 3. It is to be noted that the Duration field 312 holds information indicating the duration time from the time a CTS frame is transmitted until a NAQ frame is received. The Duration field 312 may alternatively hold information indicating the length of the data to be subsequently transmitted. This allows the own device to notify the surrounding devices that it is in a state of reception.

(Structure Example of No-Acknowledgement Request (NAQ) (Retransmission Request) Frame)

Figure 5:
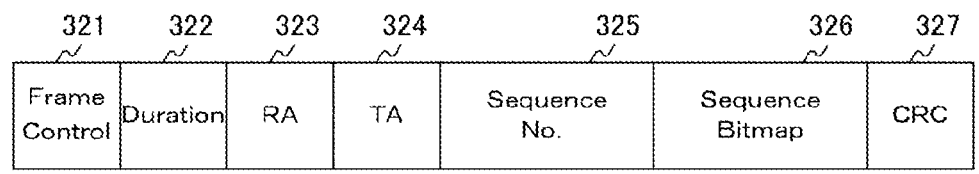
FIG. 5 is a schematic diagram depicting a structure example of a No-Acknowledgement Request (NAQ) (re-transmission request) frame transmitted and received between devices in the embodiment.

FIG. 5 is a schematic diagram depicting a structure example of a NAQ (retransmission request) frame transmitted and received between devices in the embodiment. The NAQ frame is a retransmission request frame transmitted by the destination device to the source device when requesting retransmission of undelivered data. The NAQ frame may also be considered a non-delivery notification frame notifying that there exists undelivered data.

The NAQ frame is made up of a Frame Control field 321, a Duration field 322, an RA field 323, a TA field 324, a Sequence No. field 325, a Sequence Bitmap field 326, and a CRC field 327.

The Frame Control field 321 holds information indicating that this is a NAQ frame. FIG. 7 depicts description examples of the Type field and Subtype field included in the Frame Control field 321.

The Duration field 322 holds information indicating the duration time of the NAQ frame. For example, the duration time of the NAQ frame may be from the time undelivered data is retransmitted until the retransmitted undelivered data is received. Typically, the duration time may be set to be from the time a NAQ frame is transmitted until the next NAQ frame is received.

The RA field 323 holds information indicating the address of the destination device.

The TA field 324 holds information indicating the address of the source device.

The Sequence No. field 325 holds information indicating the sequence of the first data item received.

The Sequence Bitmap field 326 holds information indicating the sequence number of the data of which the retransmission is requested (e.g., information that describes sequence number and bit relations in a bitmap format).

The CRC field 327 holds information for use in error detection.

The elements described above are examples. Other elements may be added as needed.

(Structure Examples of Aggregated Data Frame and Media Access Control (MAC) Protocol Data Unit (MPDU) Data Frame)

FIG. 6 is a schematic diagram depicting structure examples of an aggregated data frame and an MPDU data frame transmitted and received between devices in the embodiment. The aggregated data frame signifies an aggregate of data frames.

FIG. 6 depicts an example in which as many as n aggregation MAC protocol data unit (A-MPDU) subframes 330, 341 and 342 are combined to constitute a single burst. That is, each subframe unit constitutes one data sequence in this example.

The subframe may be formed as a data frame that aggregates multiple data items (subframes) addressed to the same destination. The subframe may also be formed as a data frame aggregating multiple data items (subframes) addressed to different destinations.

Depicted in the lower part of FIG. 6 is a structure example of data frames (MPDU data frames) in each subframe of the data frames depicted aggregated in the upper part of the same drawing.

The MPDU data frame is made up of a Frame Control field 331, a Duration/Identifier (ID) field 332, an Address 1 field 333, an Address 2 field 334, an Address 3 field 335, a Sequence Control field 336, an Address 4 field 337, a Quality of Service (QoS) Control field 338, a Frame Body field 339, and a Frame Check Sequence (FCS) field 340.

The Frame Control field 331 holds information indicating that this is a data frame.

The Duration field 332 holds information indicating the duration time of the data frame.

The Address 1 field 333, Address 2 field 334, Address 3 field 335, and Address 4 field 337 hold the address of the destination device, the address of the source device, and an identifier identifying a basic service set constituting a network unit, for example.

The Sequence Control field 336 holds the sequence number of the data frame, for example.

The QoS Control field 338 holds a parameter indicating the quality of service, for example.

The Frame Body field 339 holds information including actual user data.

The FCS field 340 holds information for use in error detection.

(Setting Examples of Type Field and Subtype Field)

FIG. 7 is a schematic diagram depicting setting examples of the Type field and Subtype field in the frames transmitted and received between devices in the embodiment.

Depicted in FIG. 7 are description examples of the Type field and Subtype field included in the Frame Control fields 301, 311 and 321 in the RTS frame in FIG. 3, the CTS frame in FIG. 4 and the NAQ frame in FIG. 5, respectively.

A frame kind field 351 indicates the name of the RTS frame indicated in FIG. 3, the name of the CTS frame in FIG. 4, and the name of the NAQ frame in FIG. 5.

A Type field 352 indicates the information described in the Type field included in the Frame Control fields 301, 311 and 321 of each frame.

A Subtype field 353 indicates the information described in the Subtype field included in the Frame Control fields 301, 311 and 321 of each frame.

A Description field 354 indicates newly defined content. For example, for the RTS frame depicted in FIG. 3, "01" is described in the Type field 352 and "0011" is described in the Subtype field 353. For the CTS frame depicted in FIG. 4, "01" is described in the Type field 352 and "0100" is described in the Subtype field 353. For the NAQ frame depicted in FIG. 5, "01" is described in the Type field 352 and "0101" is described in the Subtype field 353.

Suppose that data is transmitted and received in the communication system 10 depicted in FIG. 1. For example, if data is transmitted from the information processing device 100 to the information processing device 101, the information processing device 102 cannot directly receive signals from the information processing device 100 and is incapable of recognizing that the wireless transmission path is occupied. However, upon receipt of a CTS frame from the information processing device 101, the information processing device 102 can recognize that data is to be transmitted and received during the period described in the Duration field 312 (depicted in FIG. 4) of the received CTS frame. This allows the information processing device 102 to withhold transmission for that duration time.

As another example, when the information processing device 100 retransmits data to the information processing device 101, the information processing device 102 cannot directly receive signals from the information processing device 100. However, upon receipt of a NAQ frame from the information processing device 101, the information processing device 102 can recognize that retransmission data is transmitted and received during the period described in the Duration field 322 (depicted in FIG. 5) of the received NAQ frame. This allows the information processing device 102 to withhold transmission for the duration of the retransmission.

Also, suppose that the information processing device 103 transmits individual data items separately to the information processing devices 100, 101 and 102 in such a manner that the data items destined for these devices are aggregated and multiplexed when transmitted. In this case, the information processing devices 100 and 102 cannot directly receive signals from each other. This raises the possibility that a confirmation of reception and a retransmission request may collide with one another when transmitted. However, upon receipt of a signal (e.g., CTS frame or NAQ frame) from another device from which signals can be directly received, the information processing devices 100 and 102 can recognize the period in which data is to be transmitted and received. This allows each information processing device to refrain from getting the transmission from the other device during that period.

(Communication Examples)

Figure 10:
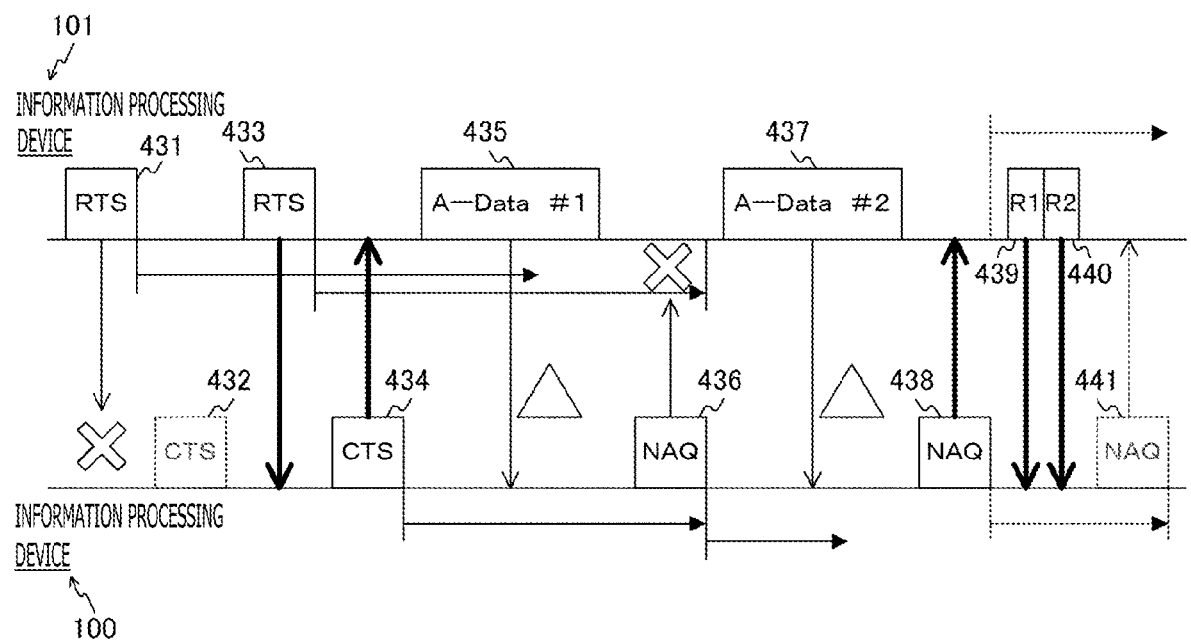
FIG. 10 is another schematic diagram depicting the flow of data transmitted and received between devices in the embodiment.
Figure 11:
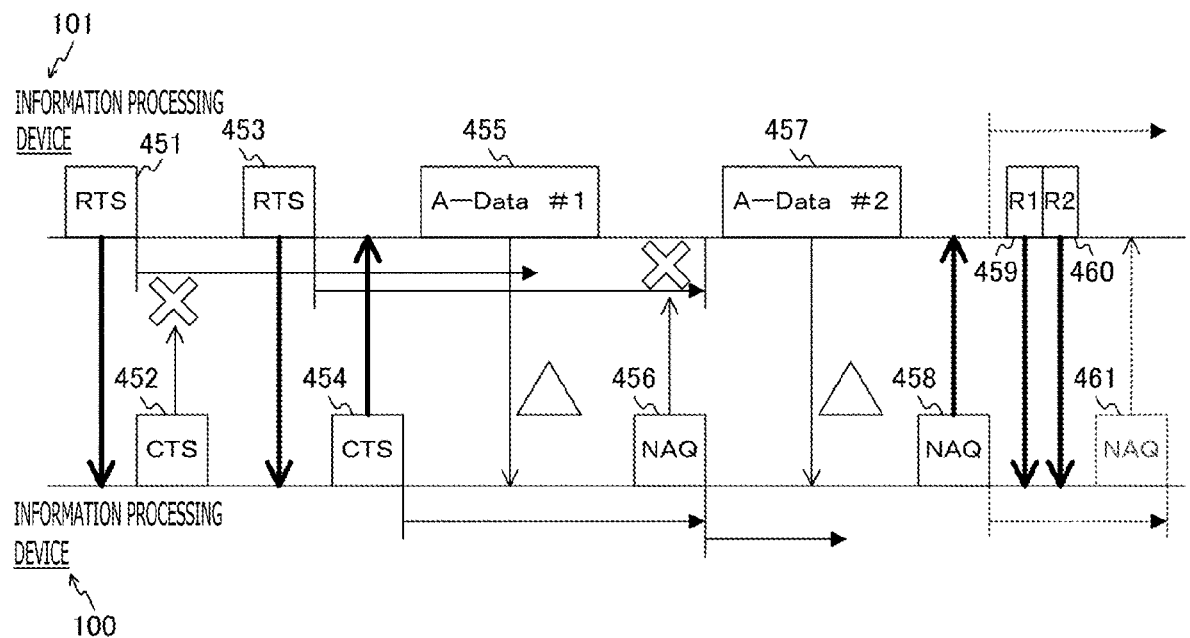
FIG. 11 is another schematic diagram depicting the flow of data transmitted and received between devices in the embodiment.
Figure 12:
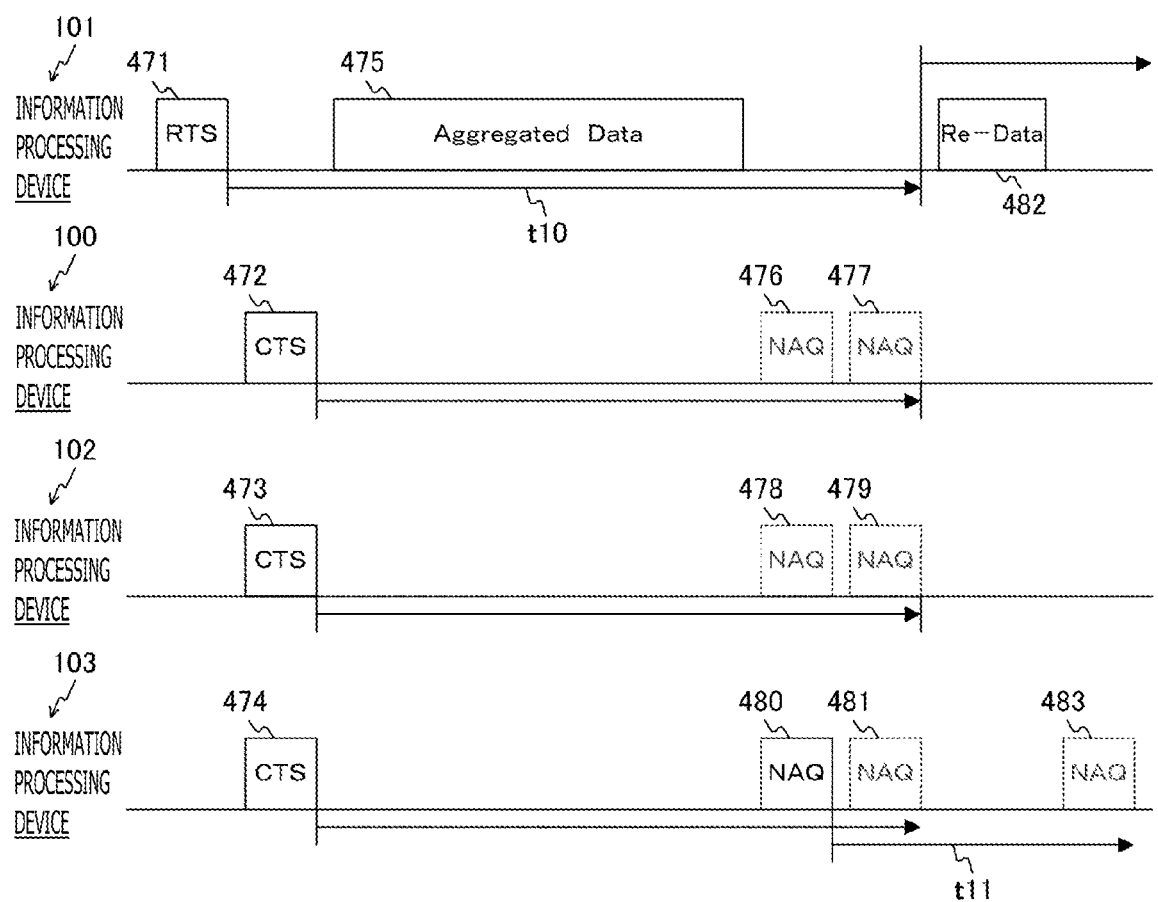
FIG. 12 is another schematic diagram depicting the flow of data transmitted and received between devices in the embodiment.
Figure 13:
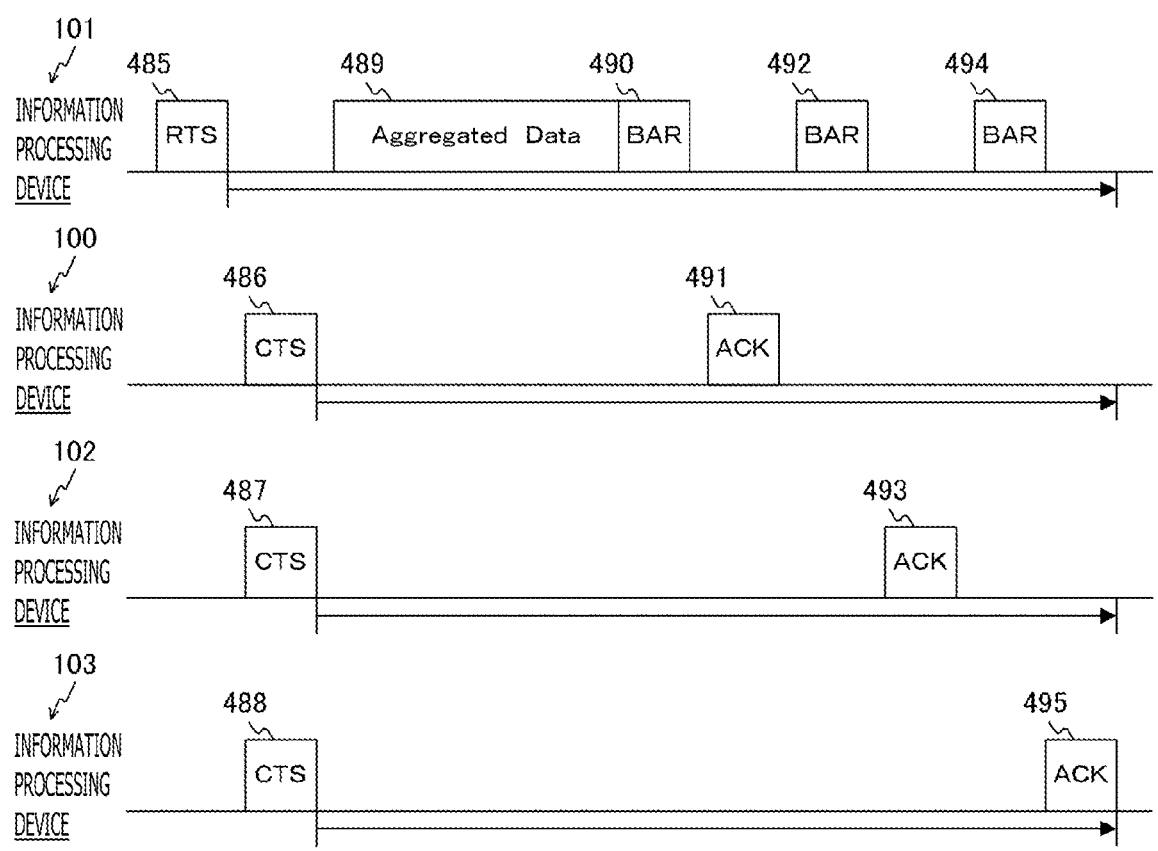
FIG. 13 is another schematic diagram depicting the flow of data transmitted and received between devices in the embodiment.
Figure 14:
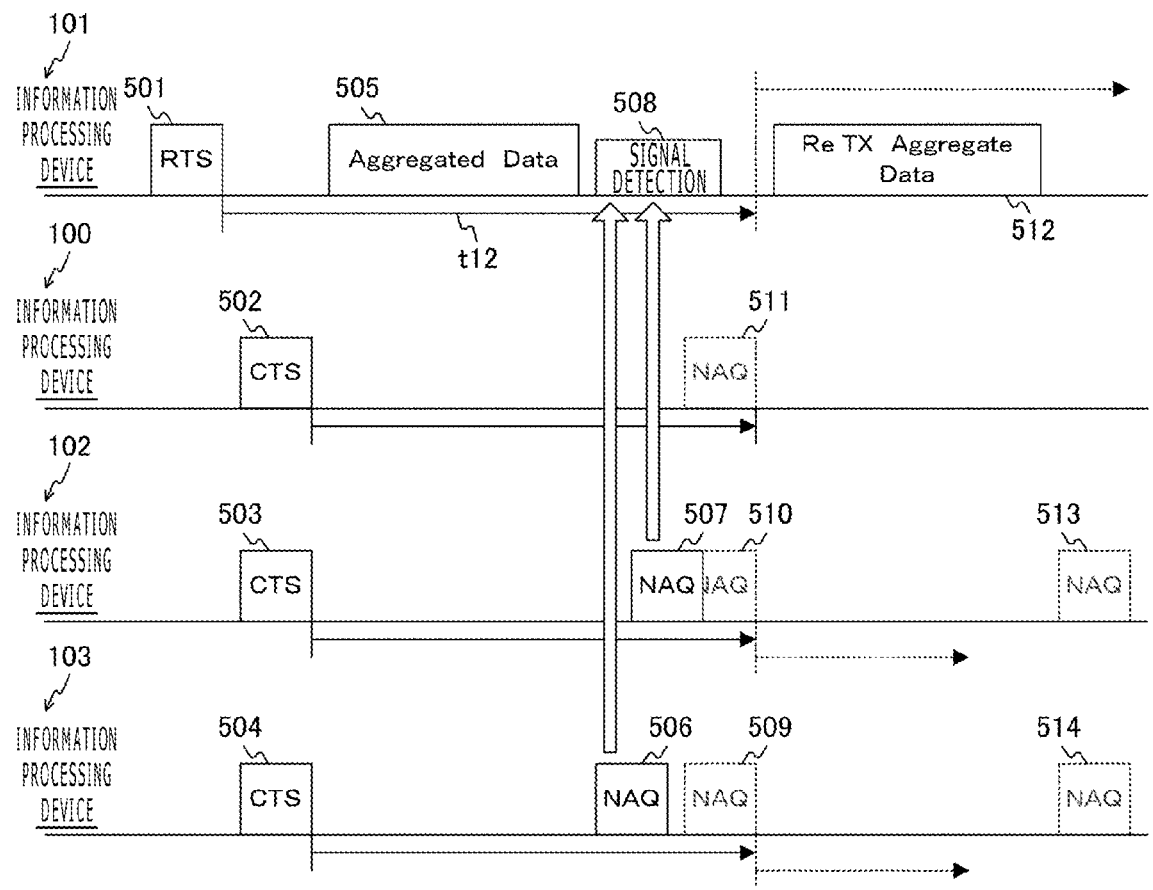
FIG. 14 is another schematic diagram depicting the flow of data transmitted and received between devices in the embodiment.

Described below with reference to FIGS. 8 to 14 are communication examples in which data is transmitted and received between multiple devices. Explained first with reference to FIGS. 8 to 11 are communication examples in which data is transmitted and received between two devices. Explained next with reference to FIGS. 12 to 14 are communication examples in which data is transmitted and received between one device on the one hand and multiple devices on the other hand.

FIGS. 8 to 11 depict examples in which the information processing device 101 is the source of data transmission and the information processing device 100 is the destination of data transmission. FIGS. 12 to 14 depict examples in which the information processing device 101 is the source of data transmission and the information processing devices 100, 102 and 103 are the destinations of data transmission.

(Communication Example of Aggregated Data)

Figure 8:
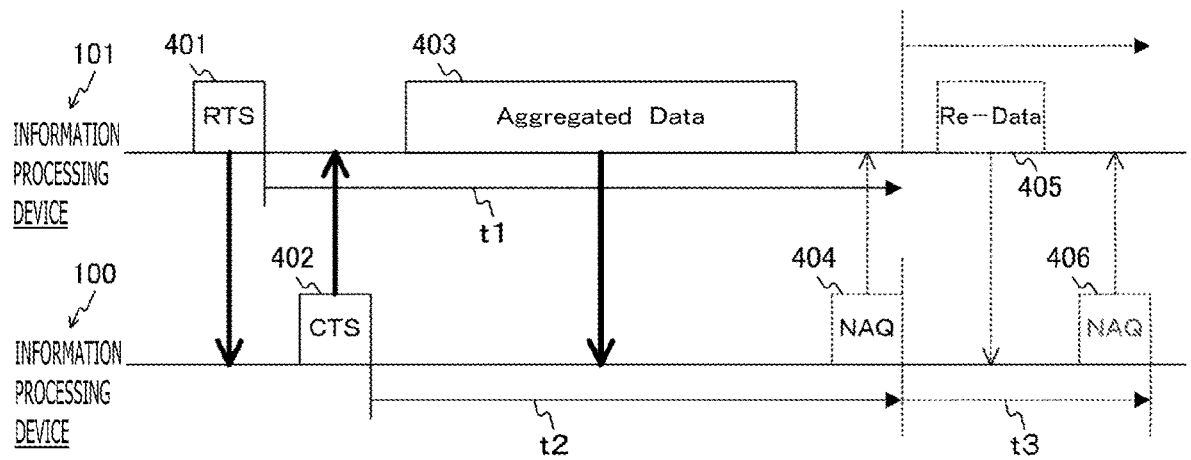
FIG. 8 is a schematic diagram depicting the flow of data transmitted and received between devices in the embodiment.

FIG. 8 is a schematic diagram depicting the flow of data transmitted and received between devices in the embodiment. Depicted in FIG. 8 is an example in which the information processing device 100 does not return a confirmation of reception (ACK) upon correct receipt of all aggregated data and returns a retransmission request (NAQ) describing the sequence number of undelivered data if part of the data is not correctly received.

When the information processing device 101 (source) transmits aggregated data (403) aggregating multiple data items to the information processing device 100 (destination), the information processing device 101 transmits an RTS frame 401 to the information processing device 100. The RTS frame 401 includes the Duration field 302 (depicted in FIG. 3) that holds a duration time t1 required to transmit all data.

The information processing device 100 determines whether or not the received RTS frame 401 describes the own device address. If it is determined that the RTS frame 401 describes the own device address, the information processing device 100 determines whether or not the data can be received within the duration time described in the Duration field 302. If it is determined that the data can be received within the time described in the Duration field 302, the information processing device 100 returns a CTS frame 402 including the Duration field 312 (depicted in FIG. 4) that describes a duration time t2 required for the data reception.

Upon receipt of a CTS frame 402 from the information processing device 100, the information processing device 101 transmits the aggregated data (403) to the information processing device 100.

Upon receipt of the aggregated data 403 from the information processing device 101, the information processing device 100 determines whether or not all data is correctly received. If it is determined that all aggregated data 403 is correctly received, the information processing device 100 does not return ACK (confirmation of reception) thereafter.

On the other hand, if part or all of the aggregated data 403 is not correctly received, the information processing device 100 returns a NAQ frame 404. In this case, the information processing device 100 describes the sequence number of the data required to be retransmitted (undelivered data) in the Sequence Bitmap field 326 (depicted in FIG. 5) of the NAQ frame 404 before transmitting the NAQ frame 404.

Preferably, a duration time t3 required for retransmission may be described in the Duration field 322 (depicted in FIG. 5) of the NAQ frame 404 in order to notify the other device that the data will be retransmitted to the own device.

Upon receipt of the NAQ frame 404 from the information processing device 100, the information processing device 101 identifies the undelivered data based on the Sequence Bitmap field 326 in the NAQ frame 404 and retransmits the undelivered data 405 thus identified.

The information processing device 100 further determines whether or not the retransmitted data (undelivered data 405) is correctly received. If it is determined that the retransmitted data (undelivered data 405) is correctly received, the information processing device 100 will not return a NAQ frame thereafter. This terminates the series of sequences.

If the retransmitted data (undelivered data 405) is not correctly received, the information processing device 100 returns a NAQ frame 406. The subsequent flow of processing is the same as at the time of transmission of the NAQ frame 404 and thus will not be discussed further.

It might happen that the information processing device 101 fails to receive the NAQ frame 404 from the information processing device 100. In view of such an eventuality, the information processing device 101 may hold the transmitted data (aggregated data 403) in its transmission buffer section (equivalent to the transmission buffer section 220 depicted in FIG. 2) until the number of retransmissions predetermined by standards is exceeded.

In the manner described above, the control section of each device may exchange a transmission request and a confirmation of transmission with the other device to verify that the data is transmitted from the other device to the own device. Following the verification, the control section may perform retransmission control using the NAQ frame, with the confirmation of reception omitted.

The control section of the information processing device 101 may set the timing for the NAQ frame to be transmitted from the information processing device 100 if there exists undelivered data in the aggregated data. Before transmission of the aggregated data, the control section of the information processing device 101 may notify the information processing device 100 of the transmission timing using the RTS frame. If the NAQ frame is not received, the control section of the information processing device 101 may continuously transmit to the information processing device 100 other aggregated data to be transmitted to the information processing device 100.

(Communication Example of Aggregated Data)

Figure 9:
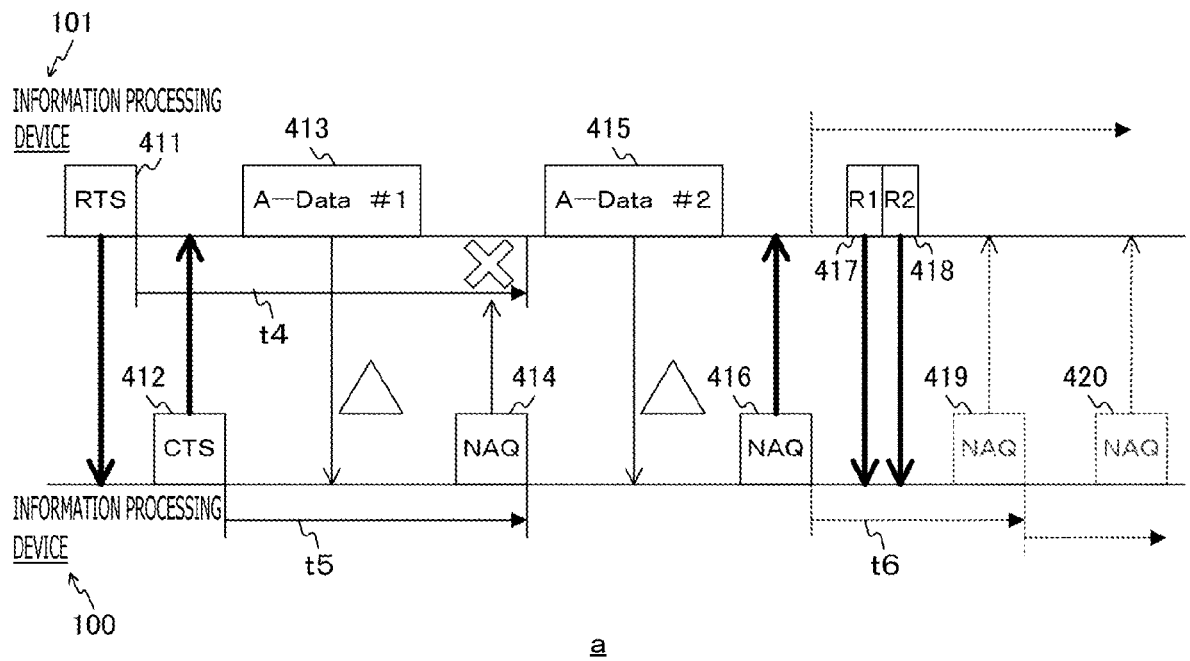
FIG. 9 is another schematic diagram depicting the flow of data transmitted and received between devices in the embodiment.
Figure 9:
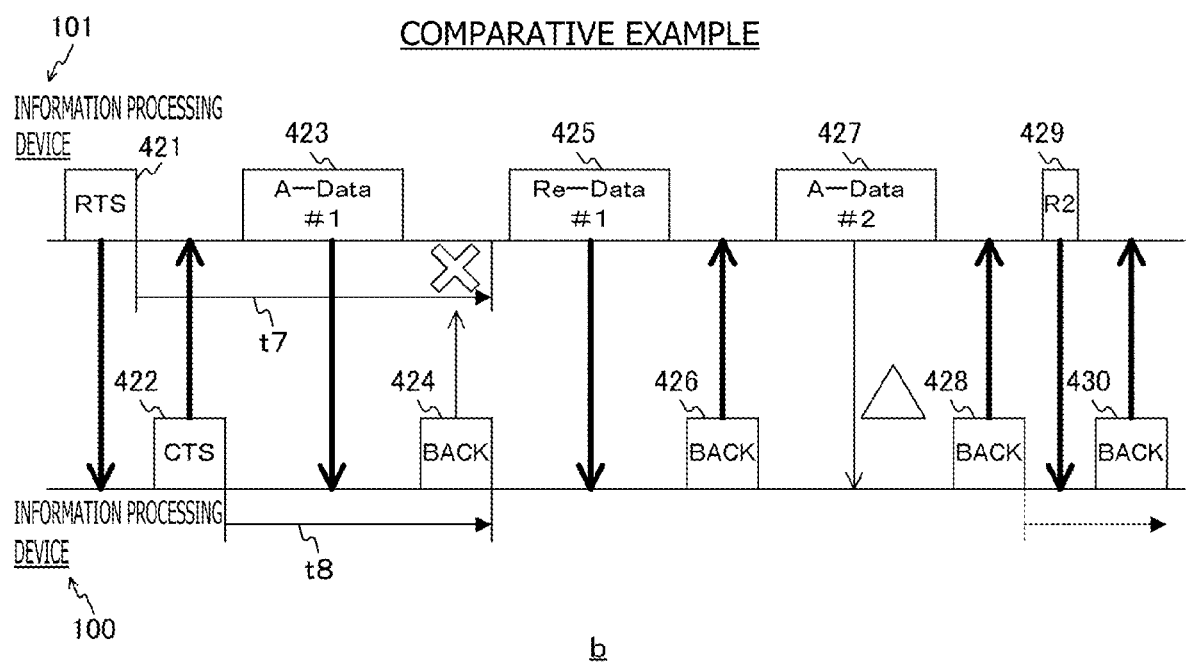

FIG. 9 is another schematic diagram depicting the flow of data transmitted and received between devices in the embodiment.

Subfigure "a" in FIG. 9 depicts an example in which a confirmation of reception for aggregated data is made using a NAQ frame. Specifically, the example of Subfigure "a" in FIG. 9 depicts that, with aggregated multiple data items held in the transmission buffer section of the information processing device 101 (source), the information processing device 101 (source) fails to receive the NAQ frame transmitted from the information processing device 100 (destination).

Subfigure "b" in FIG. 9 depicts a comparative example with respect to Subfigure "a" in the same drawing, the comparative example involving the use of Block Acknowledgement (BACK) to make a confirmation of reception of the aggregated data. Specifically, the example of Subfigure "b" in FIG. 9 depicts that, with aggregated multiple data items held in the transmission buffer section of the information processing device 101 (source), the information processing device 101 (source) fails to receive BACK transmitted from the information processing device 100 (destination).

As depicted in Subfigure "b" in FIG. 9, the information processing devices 100 and 101 first exchange an RTS frame and a CTS frame therebetween (421 and 422). Then with the transmission of first aggregated data 423 from the information processing device 101 to the information processing device 100 completed, the information processing device 100 is supposed to return BACK 424 to the information processing device 101. At this point, the information processing device 101 fails to receive BACK 424. In FIG. 9, a hollow cross (x) indicates the state where the reception has failed.

As described above, if BACK 424 is not received within a predetermined time period, the information processing device 101 retransmits the entire first aggregated data 423 (first aggregated data 425). In this case, the information processing device 100, having already received all the retransmitted data (first aggregated data 425), returns BACK 426 at a point in time at which BACK is supposed to be returned regarding the first aggregated data 425.

Receiving BACK 426 allows the information processing device 101 to transmit second aggregated data 427. In this case, however, a duration time t8 set by the information processing device 100 (destination) based on the RTS frame 421 has elapsed. Thus if the other device is not cognizant of the information processing device 100 receiving the data continuously, the information processing device 100 could potentially be interfered with by transmission from the other device.

For example, when the information processing device 101 (source) transmits the second aggregated data 427 but the information processing device 100 (destination) fails to receive part of the transmitted data, the information processing device 100 (destination) gives notification of the correctly received data using BACK 428. Following the notification, the information processing device 101 retransmits undelivered data 429 identified by BACK 428.

When the information processing device 101 transmits the undelivered data 429 and the information processing device 100 correctly receives the transmitted undelivered data 429, the information processing device 100 returns BACK 430 to the information processing device 101 indicating that all data is correctly received.

By receiving BACK 430, the information processing device 101 recognizes that the series of sequences has been correctly completed.

As depicted in Subfigure "a" in FIG. 9, the information processing devices 100 and 101 first exchange an RTS frame and a CTS frame therebetween (411 and 412). The information processing device 101 proceeds to transmit first aggregated data 413 to the information processing device 100. It is to be noted that in the example of Subfigure "a" in FIG. 9, the information processing device 100 fails to receive part of the first aggregated data 413 and thus returns a NAQ frame 414. It is assumed, however, that the information processing device 101 fails to receive the NAQ frame 414.

In this case, the information processing device 101, having failed to receive the NAQ frame 414, determines that the first aggregated data 413 is correctly transmitted and thus transmits second aggregated data 415.

The information processing device 100 can recognize, based on the sequence number of the second aggregated data 415, that what is sent is not the retransmission of the undelivered data in the first aggregated data 413 but the transmission of the second aggregated data 415. This allows the information processing device 100 to recognize that the NAQ frame 414 has failed to reach the information processing device 101. In this case, the information processing device 100 returns a NAQ frame 416 indicating that part of the first aggregated data 413 was not received.

Suppose that the information processing device 100 also fails to receive part of the second aggregated data 415 as depicted in Subfigure "a" in FIG. 9. In this case, the information processing device 100 generates NAQ information for identifying the undelivered data in the first aggregated data 413 transmitted last time as well as the undelivered data in the second aggregated data 415 transmitted this time. The information processing device 100 returns a NAQ frame 416 including the NAQ information to the information processing device 101.

Upon receipt of the NAQ frame 416, the information processing device 101 can retransmit first undelivered data 417 and second undelivered data 418 based on the NAQ information included in the NAQ frame 416. It is assumed that the first undelivered data 417 is the undelivered data in the first aggregated data 413 and that the second undelivered data 418 is the undelivered data in the second aggregated data 415.

Upon correct receipt of the retransmitted data (i.e., the first undelivered data 417 and the second undelivered data 418), the information processing device 100 can terminate the series of sequences by not returning a NAQ frame thereafter.

If the retransmitted data (i.e., the first undelivered data 417 and the second undelivered data 418) are not received correctly, the information processing device 100 returns NAQ frames 419 and 420 corresponding to the undelivered data.

The Duration field 322 (depicted in FIG. 5) in the NAQ frame describes information about the time period in which data is to be retransmitted and received. For example, the Duration field 322 (depicted in FIG. 5) in the NAQ frame 416 describes information about a duration time t6 in which data is to be retransmitted and received.

Receiving the NAQ frame 416 thus enables the other device to set a network allocation vector (NAV) as per the duration time t6 included in the NAQ frame 416 (i.e., the time period in which data is retransmitted and received). Upon receipt of the NAQ frame 416, the other device withholds transmission from the own device.

(Communication Example of Aggregated Data)

FIG. 10 is another schematic diagram depicting the flow of data transmitted and received between devices in the embodiment. Depicted in FIG. 10 is an example in which the information processing device 100 (destination) fails to receive an RTS frame transmitted from the information processing device 101 (source).

First, the information processing device 101 transmits an RTS frame 431 to the information processing device 100 before transmitting aggregated data 435. It is assumed here that the information processing device 100 fails to correctly receive the RTS frame 431 destined for the own device. In this case, having failed to receive the RTS frame 431 correctly, the information processing device 100 does not return a CTS frame 432.

Without the transmission of the CTS frame 432 from the information processing device 100, the information processing device 101 retransmits an RTS frame 433.

It is assumed that the information processing device 100 correctly receives the retransmitted RTS frame 433. In this case, the information processing device 100 returns a CTS frame 434. The sequence from this point on is the same as in the example depicted in Subfigure "a" in FIG. 9 and thus will not be discussed further.

(Communication Example of Aggregated Data)

FIG. 11 is another schematic diagram depicting the flow of data transmitted and received between devices in the embodiment. Depicted in FIG. 11 is an example in which the information processing device 101 (source) fails to receive a CTS frame transmitted from the information processing device 100 (destination).

First, the information processing device 101 transmits an RTS frame 451 destined for the information processing device 100 before transmitting aggregated data 455 thereto. In this case, the information processing device 100 correctly receives the RTS frame 451 destined for the own device and thus returns a CTS frame 452 in response.

However, it is assumed that the information processing device 101 fails to receive the CTS frame 452 transmitted from the information processing device 100. With the CTS frame 452 not correctly received, the information processing device 101 determines that the CTS frame 452 is not returned. In this case, the information processing device 101 retransmits an RTS frame 453 without transmitting the aggregated data 455. The retransmission of the RTS frame permits continuation of the transmission sequence for the aggregated data 455.

With the RTS frame 453 retransmitted, the information processing device 100 returns a CTS frame 454 in response notifying that the aggregated data 455 is receivable. The sequence from this point on is the same as in the example depicted in Subfigure "a" in FIG. 9 and thus will not be discussed further.

As described above, it might happen that following transmission of the NAQ frame, the information processing device 100 does not transmit the undelivered data (first undelivered data) corresponding to the NAQ frame. In this case, the control section 248 of the information processing device 100 receives new data destined for the own device. If there exists undelivered data in the received data, the information processing device 100 may transmit to the information processing device 101 a NAQ frame for the data including information about the first undelivered data.

(Communication Example of Aggregated Data Destined for Multiple Devices)

FIGS. 12 and 13 are other schematic diagrams depicting the flow of data transmitted and received between devices in the embodiment. FIG. 12 depicts an example in which the information processing device 101 transmits aggregated data to multiple devices (information processing devices 100, 102 and 103). FIG. 13 depicts a comparative example in which the information processing device 101 transmits aggregated data to multiple devices (information processing devices 100, 102 and 103).

The description below will be made first with reference to FIG. 13.

Before transmitting aggregated data 489 to multiple devices (information processing devices 100, 102 and 103), the information processing device 101 transmits an RTS frame 485 to these devices. In response to the RTS frame 485, the multiple devices (information processing devices 100, 102 and 103) transmit CTS frames 486, 487 and 488 respectively.

The CTS frames 486, 487 and 488 are each provided with only the address of the information processing device 101 and thus have no difference therebetween. For this reason, the multiple devices (information processing devices 100, 102 and 103) may be arranged to transmit a CTS frame simultaneously.

The information processing device 101 proceeds to transmit the aggregated data 489 to the multiple devices (information processing devices 100, 102 and 103).

The comparative example in FIG. 13 depicts that whenever data is received, ACK is always returned for confirmation of reception. It follows that the information processing device 101 is required to transmit block acknowledgement requests (BAR) 490, 492 and 494 separately so as to identify the information processing devices each returning ACK to be received by the information processing device 101.

For example, immediately after transmitting the aggregated data 489 to the multiple devices, the information processing device 101 transmits BAR 490 to the information processing device 100 and has ACK 491 returned therefrom. The information processing device 101 then transmits BAR 492 to the information processing device 102 and has ACK 493 returned therefrom. The information processing device 101 further transmits BAR 494 to the information processing device 103 and has ACK 495 returned therefrom. In this manner, the information processing device 101 needs to collect ACK eventually from all devices involved (information processing devices 100, 102 and 103).

In the comparative example depicted in FIG. 13, as described above, one device may aggregate data destined for multiple devices (information processing device 100, 102 and 103) but it takes time for the device to receive ACK for the aggregated data.

The description below will be made next with reference to FIG. 12.

In the example in FIG. 12, as in the comparative example depicted in FIG. 13, an RTS frame 471 and CTS frames 472 to 474 are exchanged in order to identify multiple destination devices (information processing devices 100, 102 and 103). However, implementation of the present technology is not limited to this mode of device identification. Some other suitable method may be used to identify beforehand multiple devices for which aggregated data is destined.

The CTS frames 472 to 474 are thus returned from the multiple devices (information processing devices 100, 102 and 103) to the information processing device 101. The information processing device 101 proceeds to transmit aggregated data 475 to the multiple devices (information processing devices 100, 102 and 103).

In the example in FIG. 12, as in the comparative example in FIG. 13, the data 475 is depicted aggregated in the direction of the time axis. Alternatively, some other suitable aggregation technique may be used to aggregate data items orthogonally to one another. For example, data items may be aggregated in the direction of the frequency axis. In another alternative, data items may each be weighted by a weighting factor using multiple-input multiple-output (MIMO) techniques before being aggregated.

The information processing device 101 may have multiple NAQ return timings (duration time t10) described in the Duration field 302 (depicted in FIG. 3) of the RTS frame 471. For example, one or multiple NAQ return timings may be set in keeping with the number of destinations (information processing devices) to which aggregated data is to be transmitted.

The example in FIG. 12 depicts that a duration time t10 is set as the period within which two NAQ frames can be returned. That is, the example in FIG. 12 is one in which NAQ frames returned from multiple devices are separately received. Whereas the example in FIG. 12 involves setting the duration time t10 within which two NAQ frames can be returned, another duration time may alternatively be set within which NAQ frames fewer than the destinations (information processing devices) can be returned. For example, if there are three destinations (information processing devices), it is allowed to set a duration time within which one or two NAQ frames can be returned. Another example may involve setting a duration time within which it is allowed to return as many NAQ frames as a value ranging from half the number of destinations (information processing devices) to the number of destinations (information processing devices) minus 1. As a further example, the number of NAQ frames that can be returned may be varied depending on the degree of possibility that NAQ frames can be returned.

The example in FIG. 12 depicts that the information processing devices 100 and 102 each correctly receive the aggregated data destined for the own device but that the information processing device 103 fails to correctly receive the data destined for the own device. In this case, the information processing device 103 returns a NAQ frame 480 to the information processing device 101 within the NAQ return timing t10 communicated in advance by the RTS frame 471.

Preferably, each of the multiple devices (information processing devices 100, 102 and 103) may return its own NAQ frame in a manner averting the collision with NAQ frames returned from the other devices. Thus the information processing device 103, for example, may set a timing by backing off randomly from the last NAQ transmission timing within a predetermined time range, and transmit a NAQ frame at that timing. This allows the information processing device 103 to avoid the collision between its NAQ frame and the NAQ frames returned from the other devices (information processing devices 100 and 102).

A duration time t11 in which to receive retransmitted data may be described in the Duration field 322 (depicted in FIG. 5) of the NAQ frame 480. In this case, the device may notify the other devices that it is about to receive the retransmitted data destined for that device.

Having received the NAQ frame 480 from the information processing device 103, the information processing device 101 retransmits only the data (undelivered data 482) of which the sequence number is described in the NAQ frame 480. In this case, whereas the information processing device 101 transmits the undelivered data 482 to the other devices, the devices (information processing devices 100 and 102) other than the information processing device 103 discard the transmitted undelivered data 482, so that only the information processing device 103 receives the undelivered data 482.

If the information processing device 103 has correctly received the undelivered data 482 retransmitted from the information processing device 101, the information processing device 103 does not return a NAQ frame. This improves the efficiency of transmission path utilization. On the other hand, if the information processing device 103 fails to correctly receive the undelivered data 482 retransmitted from the information processing device 101, the information processing device 103 returns a NAQ frame 483.

As described above, retransmission is requested only if data is not correctly received. This shortens the time required to receive ACK frames separately.

When a retransmission request is not made at the NAQ frame return timing, the information processing device 101 determines that the data transmission has been successful. However, the information processing device 101 may preferably hold the target data in its transmission buffer section for a predetermined time period in view of retransmission requests to be made at calculated timings at which as many NAQ frames as a predetermined retransmission count may be retransmitted. For example, the timing described in the Duration field of the immediately preceding NAQ frame may be replaced with a timing allowing for the elapse of a maximum retransmission count predetermined by standards.

As described above, when aggregated data is transmitted to multiple devices, the control section of the information processing device 101 may set the NAQ frame transmission timing on the basis of a number smaller than the number of the multiple devices configured. Also, the control section of the information processing device 103 may set the timing for transmitting a NAQ frame to the information processing device 101 by backing off from the NAQ frame transmission timing communicated from the information processing device 101.

(Detection Example of NAQ Frame)

FIG. 14 is another schematic diagram depicting the flow of data transmitted and received between devices in the embodiment. FIG. 14 depicts an example in which NAQ frames returned concurrently from multiple devices (information processing devices 102 and 103) are correctly detected. The example in FIG. 14 also depicts that a NAQ frame not correctly received typically due to interference from another device is nevertheless detected.

For example, suppose that the timing at which a NAQ frame 507 is returned by the information processing device 102 coincides with the timing at which a NAQ frame 506 is returned by the information processing device 103.

In this case, if the information processing device 101 detects a reception field intensity higher than a threshold value within a NAQ frame return timing t12, the information processing device 101 determines that a NAQ frame is received (508). Because there is a high possibility that multiple devices (information processing devices 102 and 103) have made retransmission requests at this point, the information processing device 101 retransmits aggregated data 505 that was transmitted last time to the multiple devices. In other words, the information processing device 101 transmits aggregated data 512.

That is, by retransmitting the aggregated data 512 destined for all devices (information processing devices 100, 102 and 103), the information processing device 101 can send the aggregated data 512 to the multiple devices (information processing devices 102 and 103) for which there exists undelivered data.

Upon receipt of the aggregated data 512, the information processing devices 102 and 103 determine that the previously undelivered data is now correctly received. With all data correctly received, the information processing devices 102 and 103 do not return NAQ frames. This completes the reception processing.

As described above, if the control section of the information processing device 101 detects a signal whose reception field intensity is higher than a threshold value at the transmission timing of NAQ frames, the control section of the information processing device 101 can perform control to retransmit all aggregated data as the undelivered data.

If the information processing device 101 is capable of separating NAQ frame signals coming from the information processing devices 102 and 103, then the information processing device 101 may separate the NAQ frames to identify the undelivered data and retransmit only the undelivered data.

As described above, where aggregated data destined for multiple devices are transmitted, a protocol for receiving retransmission request NAQ frames is defined in place of one for separately receiving an ACK frame from each device. This improves the efficiency of transmission path utilization.

(Operation Examples of Information Processing Device)

Operation examples of the information processing device 100 are described below. These operations are performed on the basis of a wireless communication protocol for exchanging data between multiple information processing devices.

(Operation Example (Example of Data Transmission) of Information Processing Device (Source))

Figure 15:
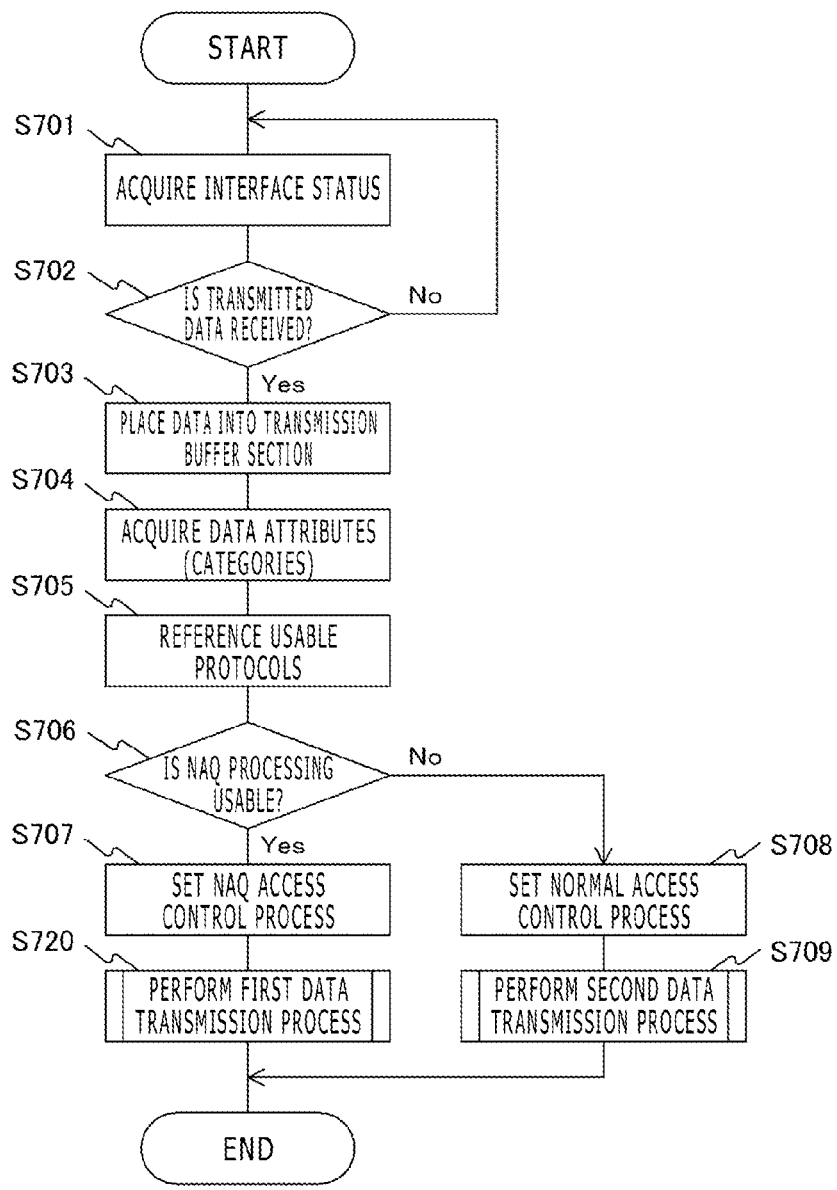
FIG. 15 is a flowchart depicting the procedure of data transmission processing performed by the information processing device 100 embodying the present technology.

FIG. 15 is a flowchart depicting the procedure of data transmission processing performed by the information processing device 100 embodying the present technology. FIG. 15 depicts an example in which the information processing device 100 acts as the source of data transmission. The example of FIG. 15 is explained below with reference to FIG. 2.

First, the control section 248 acquires the status of the interface 210 (step S701). The control section 248 then determines whether or not transmitted data is being received (step S702). If transmitted data is not received, the control section 248 returns to step S701.

If transmitted data is being received (step S702), the control section 248 places the received data into the transmission buffer section 220 (step S703). The control section 248 proceeds to acquire the data attributes (categories) of the transmitted data in the transmission buffer section 220 (step S704). What is acquired as the data attributes (categories) may include, for example, a priority control system (Enhanced Distributed Channel Access (EDCA)) under IEEE 802.11e, image data/audio data, priority, availability of aggregation, and Time-to-Live (TTL).

On the basis of the acquired data attributes (categories), the control system 248 references usable protocols (step S705). The control section 248 then determines whether or not the sequence for exchanging NAQ frames is usable (step S706). For example, the data to be transmitted quickly is preferably transmitted using an ACK frame without recourse to aggregation. For the data to be transmitted rapidly, the control section 248 determines that the sequence for exchanging NAQ frames is not usable. The data to be transmitted promptly may be emergency data or emergency calls (such as data for reporting a danger to life), for example. The emergency calls typically constitute information about the life of a person or an animal (e.g., information reporting a heart attack or information indicating that a person has collapsed). For ordinary content (e.g., image or audio content) that need only be transmitted normally, it is determined that the sequence for exchanging NAQ frames is usable.

If the sequence for exchanging NAQ frames is usable (step S706), the control section 248 sets an access control process based on NAQ (retransmission request) (step S707). Then a first data transmission process is performed (step S720). The first data transmission process will be discussed later in detail with reference to FIG. 16.

If the sequence for exchanging NAQ frames is not usable (step S706), the control section 248 sets a normal access control process (step S708). Then a second data transmission process is performed (step S709). The second data transmission process is a normal data transmission process and thus will not be discussed further.

(Operation Example (Example of Data Transmission) of Information Processing Device (Source))

Figure 16:
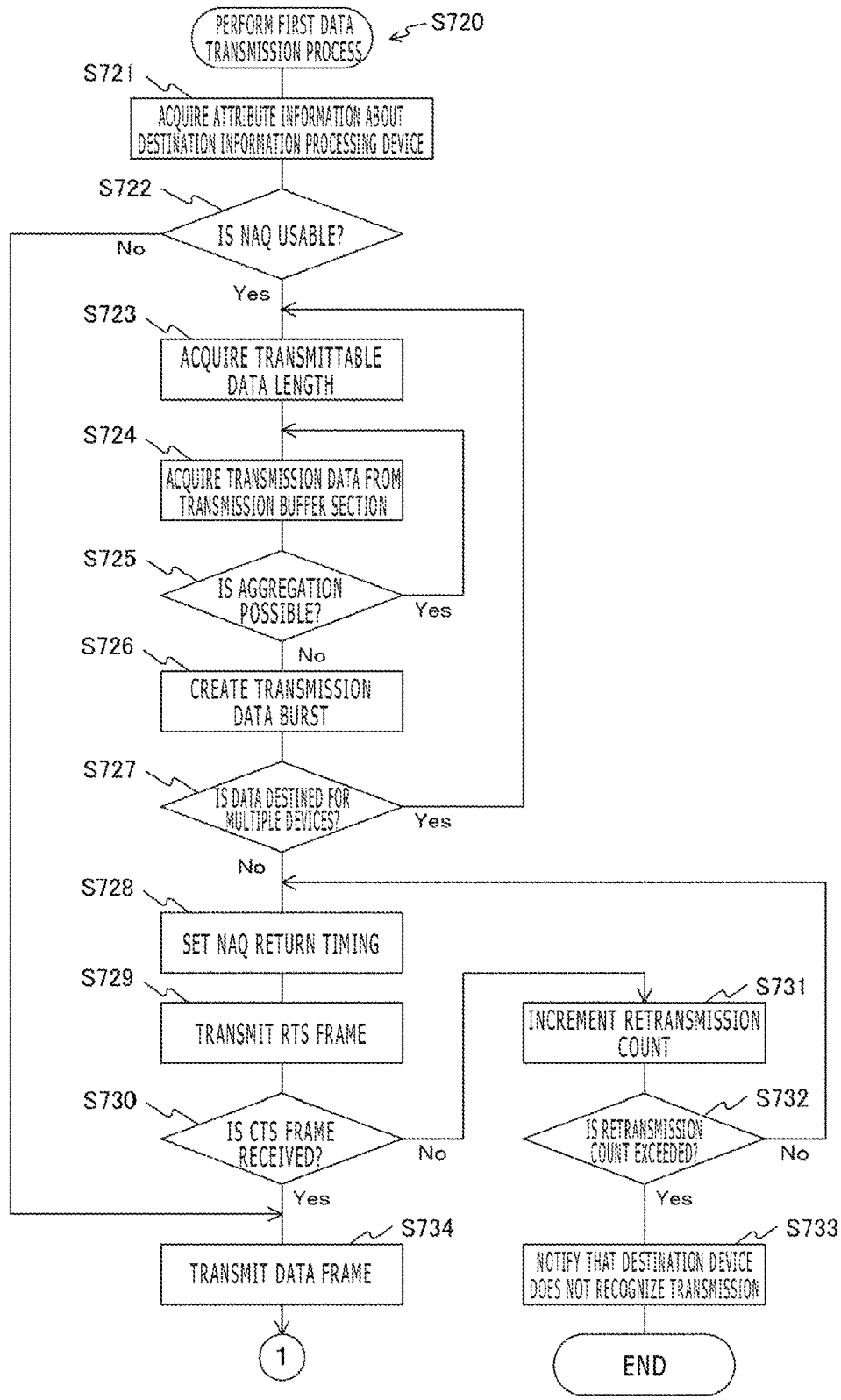
FIG. 16 is a flowchart depicting a first data transmission process as part of the data transmission processing performed by the information processing device 100 embodying the present technology.
Figure 17:
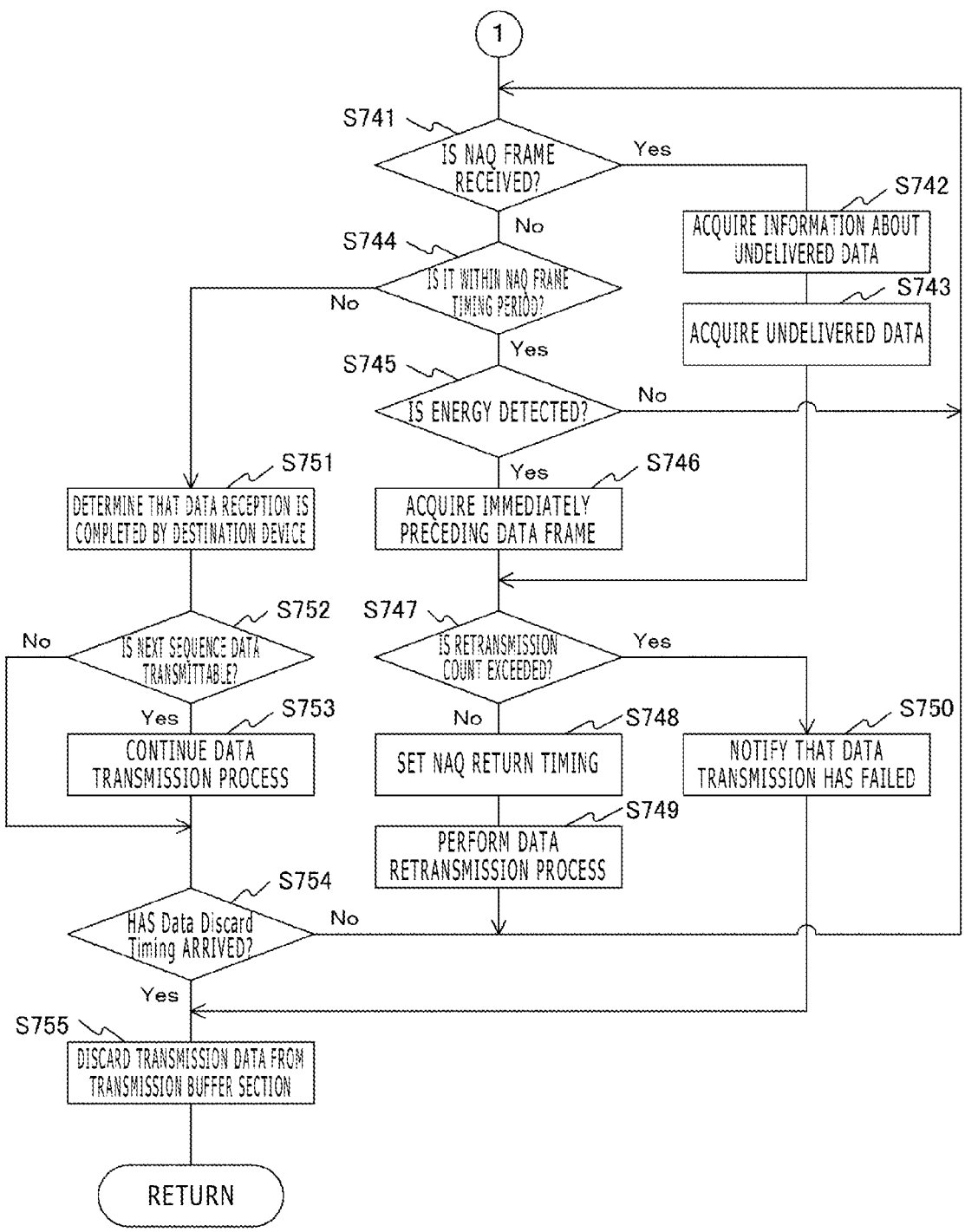
FIG. 17 is another flowchart depicting the first data transmission process as part of the data transmission processing performed by the information processing device 100 embodying the present technology.

FIGS. 16 and 17 are flowcharts depicting the first data transmission process (the procedure of step S720 depicted in FIG. 15) as part of the data transmission processing performed by the information processing device 100 embodying the present technology.

First, the control section 248 acquires the attribute information about the information processing device serving as the destination of data transmission (step S721). The control section 248 determines whether or not the data transmission destination can use the confirmation of reception based on the retransmission request (NAQ) (step S722). That is, it is determined whether or not the destination can use NAQ-based communication control. It is assumed here that the attribute information about the information processing device serving as the destination of data transmission is held by the control section 248 following preliminary association involving an exchange of parameters.

If the data transmission destination cannot use the confirmation of reception based on the retransmission request (NAQ) (step S722), the control section 248 transmits the data frame of the transmission data held in the transmission buffer section 220 (step S734).

If the data transmission destination can use the confirmation of reception based on the retransmission request (NAQ) (step S722), the control section 248 acquires a transmittable data length (step S723). The control section 248 proceeds to acquire the transmission data from the transmission buffer section 220 (step S724).

If aggregation is to be used at this point, the control section 248 determines whether or not the transmission data next to the acquired transmission data can also be aggregated (step S725). If it is determined that the next transmission data can also be aggregated (step S725), the control section 248 acquires the immediately following data (step S724) thus repeating the process of aggregation.

At the end of the aggregation process (or when no further data can be aggregated) (step S725), a transmission data burst is created (step S726). The control section 248 then determines whether or not to transmit the data to multiple devices (step S727). If it is determined that the data is to be transmitted to multiple devices (step S727), the control section 248 again acquires a transmittable data length and creates the data destined for another device (steps S724 to S726).

When the creation of the data constituting a single transmission burst is completed (step S727), the control section 248 sets the timing of returning a retransmission request (NAQ) (step S728). For example, the timing may be set as the duration time t1 depicted in FIG. 8. Where the data is to be transmitted to multiple devices, multiple return timings may be set (step S728). For example, the timings may be set as the duration time t10 depicted in FIG. 12.

Prior to the data transmission, an RTS frame is transmitted (step S729). The control section 248 proceeds to determine whether or not a CTS frame is received (or whether or not a predetermined signal is detected) upon elapse of a predetermined time period (step S730). If it is determined that the CTS frame is received upon elapse of the predetermined time period (step S730), the data frame is transmitted (step S734).

If the CTS frame is not received upon elapse of the predetermined time period (step S730), the control section 248 increments the retransmission count by 1 (step S731) to determine whether or not a predetermined retransmission count is exceeded (step S732). If it is determined that the predetermined retransmission count is exceeded (step S732), the control section 248 determines that the data transmission destination does not recognize the data transmission, notifies the user to that effect (step S733), and terminates the first data transmission process. For example, the user output section 130 may be arranged to output notification that the data transmission destination does not recognize the data transmission (e.g., by displaying a message or giving a voice output to that effect) (step S733).

If a signal indicating refusal of NAQ from the destination information processing device is received in place of the CTS frame upon elapse of the predetermined time period (step S730), the control section 248 may return to step S708 depicted in FIG. 15 and proceed with normal data transmission.

Following transmission of the data frame (step S734), the control section 248 waits to receive a NAQ frame or to detect an energy level exceeding a predetermined reception field intensity over a predetermined time period (NAQ return timing) (steps S741, S744 and S745). If a NAQ frame is received (step S741), the control section 248 acquires the information about undelivered data included in the received NAQ frame (step S742), before obtaining the undelivered data (step S743).

If, within the NAQ return timing (step S744), an energy level exceeding the predetermined reception field intensity is detected (step S745), the control section 248 acquires all the most recently transmitted data (step S746). If, as depicted in FIG. 14, retransmission requests are made from multiple devices (information processing devices 102 and 103), an energy level exceeding the predetermined reception field intensity is detected. In this case, the control section 248 transmits to each device all the most recently transmitted data.

The control section 248 then determines whether or not the retransmission count is exceeded (step S747). In this case, the number of times a data unit has been transmitted is verified. If the retransmission count is not exceeded (step S747), the control section 248 sets the next NAQ return timing (step S748) and retransmits the data (step S749).

If the retransmission count is exceeded (step S747), the control section 248 notifies the user of a failure to transmit data (e.g., by displaying a message or giving a voice output to that effect) (step S750), and discards the transmission data from the transmission buffer section 220 (step S755).

If a NAQ frame or the predetermined energy level is not detected until the NAQ return timing comes to an end (step S744), the control section 248 provisionally determines that the destination information processing device has completed the data reception (step S751). The control section 248 then determines whether or not the transmission data of the next sequence is transmittable (step S752). If it is determined that the transmission data of the next sequence is transmittable (step S752), the control section 248 transitions uninterruptedly to the first data transmission process (step S753). The first data transmission process is depicted in FIG. 16. In this case, the current process may alternatively be performed in parallel with the first data transmission process in FIG. 16.

If the transmission data of the next sequence does not exist or is not transmittable (step S752), the control section 248 determines whether a predetermined time has come to discard the data (step S754). If it is determined that the predetermined time has arrived (step S754), the transmission data held in the transmission buffer section 220 is discarded (step S755). Incidentally, steps S741 to S743, S748 and S749 constitute an example of the procedure for transmission control stated in the appended claims.

(Operation Example (Example of Data Reception) of Information Processing Device (Destination))

Figure 18:
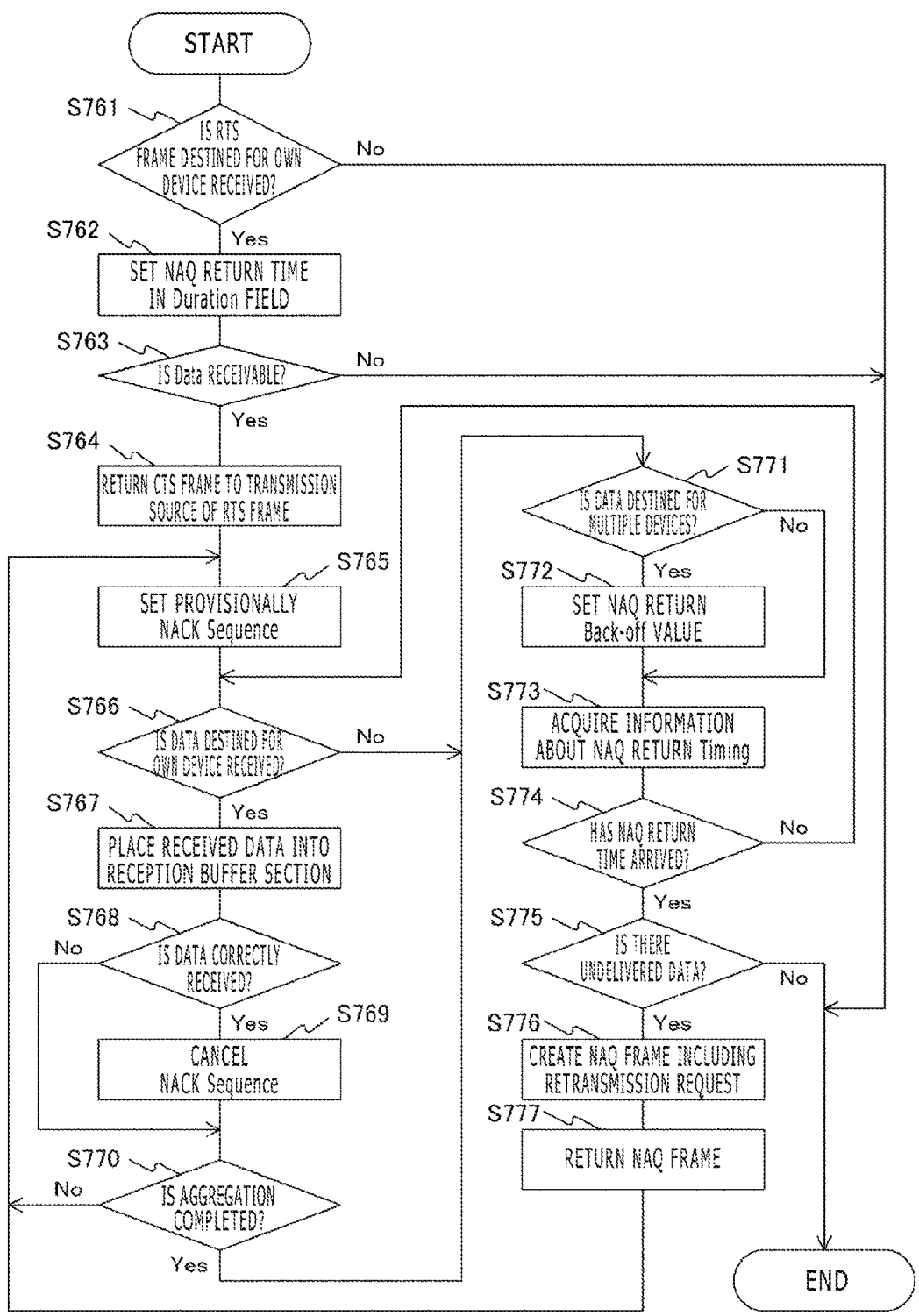
FIG. 18 is a flowchart depicting the procedure of data reception processing performed by the information processing device 100 embodying the present technology.

FIG. 18 is a flowchart depicting the procedure of data reception processing performed by the information processing device 100 embodying the present technology. FIG. 18 depicts an example in which the information processing device 100 is the destination (of data transmission). The example in FIG. 18 is explained below with reference to FIG. 2.

First, the control section 248 determines whether or not an RTS frame destined for the own device is received (step S761). If it is determined that an RTS frame destined for the own device is not received (step S761), the control section 248 terminates the operation of the data reception processing.

If an RTS frame destined for the own device is received (step S761), the control device 248 recognizes that data destined for the own device is about to be transmitted, and sets the timing for NAQ return (step S762). For example, the control section 248 may set the NAQ return timing based on the information described in the Duration field 302 (depicted in FIG. 3) of the RTS frame destined for the own device.

The control section 248 proceeds to determine whether or not the data corresponding to the RTS frame destined for the own device can be received (step S763). If it is determined that data reception is not possible (step S763), the control section 248 terminates the operation of the data reception processing. In this case, the control section 248 may notify the transmission source that data reception is not possible.

If data reception is determined to be possible (step S763), the control section 248 returns a CTS frame to the information processing device acting as the transmission source of the RTS frame (step S764).

The control section 248 then provisionally sets a NACK sequence number for the data to be transmitted (step S765), and receives the data destined for the own device. The NACK sequence number of the data to be transmitted is set on the basis of the sequence number described in the Sequence No. field 305 (depicted in FIG. 3) of the received RTS frame.

When the data destined for the own device is received (step S766), the control section 248 places the received data into the reception buffer section 230 (step S767). The control section 248 determines whether or not the data is correctly received (step S768). For example, the control section 248 may determine whether or not the data is correctly received on the basis of a cyclic redundancy code (CRC) suffixed to the received data.

If it is determined that the data is correctly received (step S768), the control section 248 cancels the NACK sequence number of the correctly received data (step S769). If the data is not correctly received (step S768), the sequence number of the data not correctly received is retained as non-delivery information.

If the aggregated data is continued at this point (step S770), the control section 248 returns to step S765 and proceeds with the data reception.

If the aggregated data is completed (step S770), the control section 248 determines (step S771) whether or not the received data is destined for multiple devices (i.e., whether or not the data includes data destined for any other device). If it is determined that the received data is destined for multiple devices (step S771), the control section 248 sets a back-off value for NAQ return (step S772).

The control section 248 then acquires information about the NAQ return timing (step S773). The control section 248 determines whether or not the NAQ return time has arrived (step S774). If it is determined that the NAQ return time has arrived (step S774), the control section 248 determines (step S775) whether or not there exists undelivered data (i.e., whether or not the NACK sequence number is being held).

If it is determined that there exists no undelivered data (step S775), the control section 248 creates a NAQ frame including a retransmission request (step S776), and transmits the NAQ frame (step S777).

If there exists no undelivered data (step S775), the control section 248 terminates the operation of the data reception processing without transmitting a NAQ frame. Incidentally, steps S765 to S777 constitute an example of the control procedure for not transmitting the confirmation of reception as stated in the appended claims.

(Operation Example (Example of NAV Setting) of Information Processing Device (Another Device))

Figure 19:
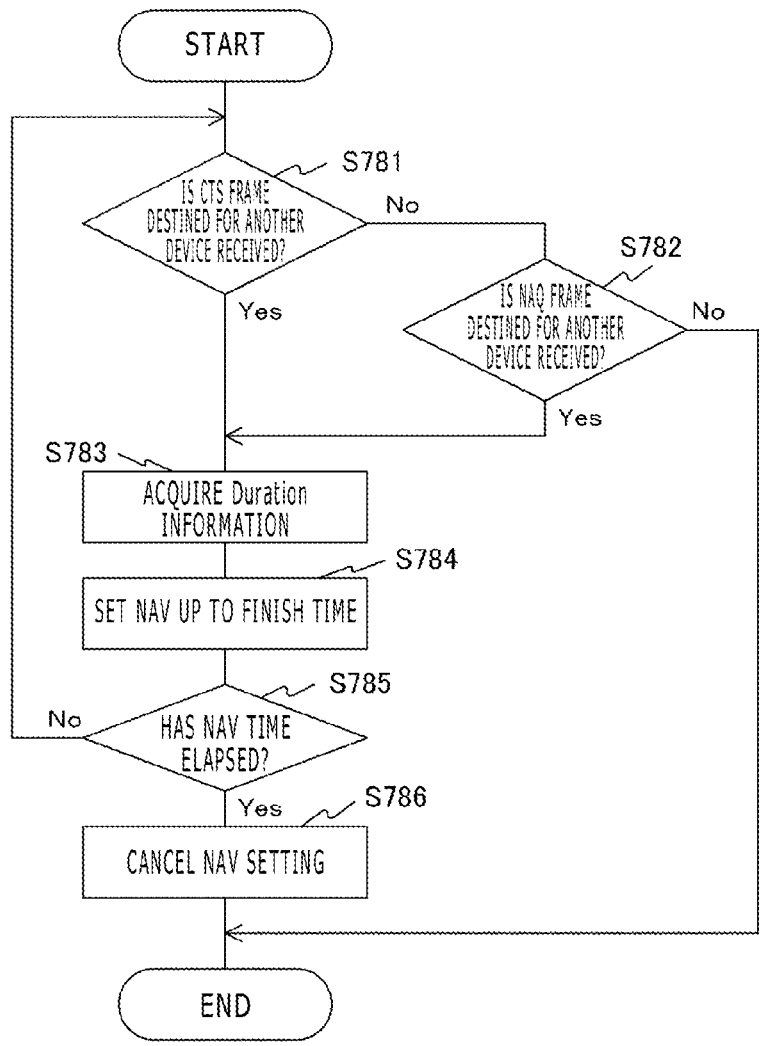
FIG. 19 is a flowchart depicting the procedure of Network Allocation Vector (NAV) setting processing performed by the information processing device 100 embodying the present technology.

FIG. 19 is a flowchart depicting the procedure of NAV setting processing performed by the information processing device 100 embodying the present technology. FIG. 19 depicts an example in which the information processing device 100 is a device not involved in data transmission or reception (as another device). The example in FIG. 19 is explained below with reference to FIG. 2.

First, the control section 248 determines whether or not a CTS frame destined for another device is received (step S781). If it is determined that a CTS frame destined for another device is not received (step S781), the control section 248 determines whether or not a NAQ frame destined for another device is received (step S782). If it is determined that an NAQ frame destined for another device is not received (step S782), the control section 248 terminates the operation of the NAV setting process.

If it is determined that a CTS frame destined for another device is received (step S781), the control section 248 acquires the information described in the Duration field 312 (depicted in FIG. 4) of the CTS frame (finish time of data reception) destined for the other device (step S783). Likewise, if a NAQ frame destined for another device is received (step S782), the control section 248 acquires the information described in the Duration field 322 (depicted in FIG. 5) of the NAQ frame (finish time of data reception) destined for the other device (step S783).

The control section 248 proceeds to set NAV (step S785) based on the acquired information (finish time of data reception). That is, the control section 248 sets the NAV as the period up to the acquired finish time of data reception.

The control section 248 then determines whether or not the NAV set time has elapsed (step S785). If it is determined that the NAV set time has yet to elapse (step S785), the control section 248 returns to step S781. If the NAV set time has elapsed (step S785), the control section 248 cancels the NAV setting (step S786).

In this manner, the control section 248 may perform access control to withhold the transmitting operation until the NAV setting based on the CTS frame or NAQ frame destined for another device is canceled.

As described above, upon receipt of data describing the retransmission request return timing from another device located nearby, the control section 248 of the information processing device 100 performs control to withhold the transmission of signals during the retransmission request return timing.

(Example of Making Retransmission Request in Keeping with Processing Capacity of Transmission Destination)

Described below is an example in which a retransmission request is made in keeping with the processing capacity of the destination device (receiving device).

Figure 20:
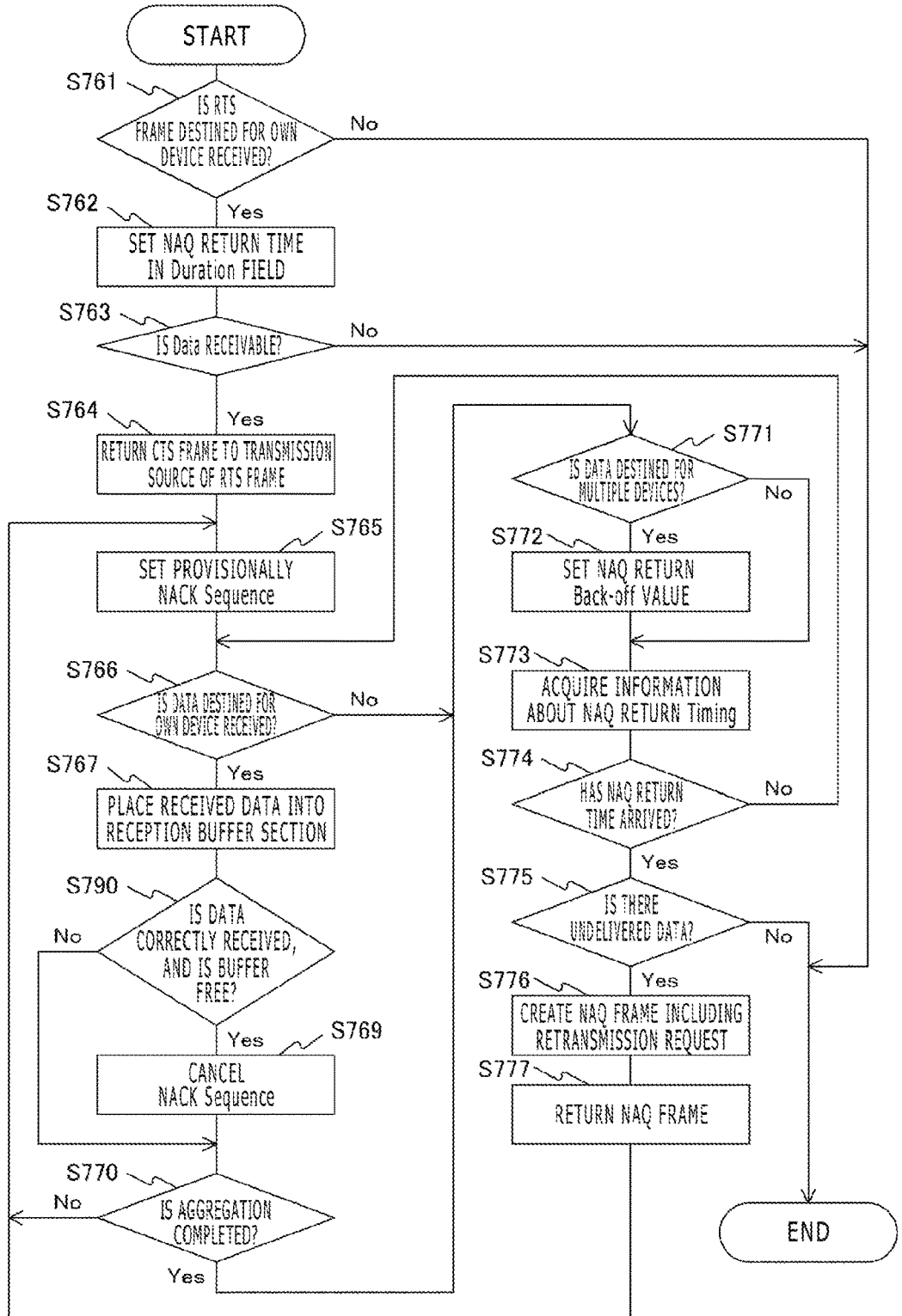
FIG. 20 is another flowchart depicting the procedure of data reception processing performed by the information processing device 100 embodying the present technology.

FIG. 20 is another flowchart depicting the procedure of data reception processing performed by the information processing device 100 embodying the present technology. FIG. 20 depicts a variation of the example depicted in FIG. 18, with step S790 replacing step S768 in FIG. 18. Thus the same steps as in FIG. 18 are given the same reference signs, and their explanations are omitted hereunder.

With existing wireless LAN systems, the destination device that has received data notifies the source device that data reception is complete by returning ACK thereto for confirmation of reception. Where BACK is utilized in transmitting aggregated data for example, the destination device returns information about the correctly received data from among the transmitted aggregated data.

For example, where BACK is utilized, the source device and the destination device exchange parameters such as buffer size information beforehand in order to identify the amount of information that can be received until ACK is returned. Aggregated frames are then transmitted only within the buffer size acquired through the exchange of parameters.

Under existing wireless LAN communication protocols, it is impossible to explicitly designate the data requested to be retransmitted by the destination device (receiving device). With techniques involving the use of BACK, only the information about undelivered data is returned. That means retransmission cannot be requested in a manner reflecting the status of the destination device.

Where BACK is utilized, it is necessary to exchange parameters such as buffer size prior to data transmission. Multiple data items cannot be transmitted without recourse to ACK. It is impossible to perform control utilizing BACK and involving dynamically changing parameters in accordance with the buffer size and the processing capacity of the destination device.

In the example of FIG. 20, the return of a specific retransmission request from the destination device permits communication control reflecting the processing status of the destination device. It is also possible to return to the source device a retransmission request reflecting the processing capacity of the destination device without the source device being notified beforehand of the buffer size and the processing capacity of the destination device.

The source device retransmits the data in accordance with a retransmission request from the destination device. The source device performs the retransmission process as needed by the destination device and recognizes the processing capacity of the destination device at the time of transmission.

Specifically, in the example of FIG. 20, the amount of data requested to be retransmitted may be adjusted in a manner reflecting the status of the information processing device 100 (destination). For example, where aggregated data is transmitted, the source device transmits the data without designating the buffer size beforehand. If the reception buffer section 230 of the information processing device 100 (destination) overflows, the information processing device 100 (destination) can request retransmission of all data.

That is, upon receipt of the data destined for the own device (step S766), the control section 248 stores the received data into the reception buffer section 230 (step S767). The control section 248 determines whether or not the data is correctly received and whether or not the reception buffer section 230 has a free space (step S790). In this case, the control section 248 may determine whether or not the reception buffer section 230 has a free space larger than a predetermined amount.

If it is determined that the data is correctly received and that the reception buffer section 230 has a free space (step S790), the control section 248 goes to step S769. If the data is not correctly received or if the reception buffer section 230 does not have a free space (step S790), the control section 248 goes to step S770. That is, if the reception buffer section 230 overflows, for example, the control section 248 requests data retransmission without canceling the NACK sequence.

As described above, if the reception buffer section 230 for holding the data destined for the own device does not have a free space larger than a predetermined amount, the control section 248 of the information processing device 100 may perform control to transmit a NAQ frame to another device.

In the example of FIG. 20, with BACK utilized as explained above, it is possible to explicitly notify the source device of a retransmission request in accordance with the processing capacity of the information processing device 100. This makes it possible to communicate BACK processing-related parameters reflecting the information processing capacity of the information processing device 100. It is also possible to transmit aggregated data from the source device without notifying it beforehand of the size of the reception buffer section 230 of the information processing device 100, which simplifies the BACK-related processing.

The explicit notification of the data requested to be retransmitted allows the information processing device 100 to dynamically change the amount of information to be stored in the reception buffer section 230. This enables the reception buffer section 230 to be used efficiently.

With this embodiment, as described above, the confirmation of reception (ACK) is not returned upon completion of data reception as long as the execution of data transmission based on frame aggregation is recognized beforehand. On the other hand, if the data is not correctly received, a retransmission request (NAQ) is returned.

The destination device is cognizant beforehand of the timing for receiving the retransmission request (NAQ). Upon failure to receive the data transmitted subsequent to the timing (or if part of the transmitted data has an error), the destination device requests retransmission of only the undelivered data. The timing for receiving the retransmission request (NAQ) may be acquired using a transmission request (RTS frame), for example.

The source device may retain the transmitted data until a predetermined point in time at which a predetermined retransmission count is to be reached, in consideration of a possible failure to receive a retransmission request (NAQ) from the destination device. That is, the source device may hold the transmitted data over a predetermined time period established on the basis of the retransmission request (NAQ) transmission timing. This implements a communication protocol that provides an opportunity of receiving multiple retransmission requests (NAQ) after which the retained data is discarded.

Given the frame aggregation techniques for permitting multiple devices to request retransmission, the sequences of retransmission requests are used by these destination devices to return retransmission requests (NAQ) to the source device during a predetermined time interval.

Specifically, the source device sets aside a time period in which to arrange multiple retransmission request (NAQ) return timings. Each of the destination devices sets its own retransmission request (NAQ) return timing in a manner randomly backing off from the last return timing, and returns a retransmission request (NAQ) accordingly to the source device.

The retransmission request (NAQ) return timing may be arranged to be within a variable back-off range that reflects the number of the destination devices involved. That is, where numerous destination devices are involved, more transmission opportunities may be provided.

In view of the possibility that multiple retransmission requests may collide with each other, the source device may retransmit all data upon detecting a signal whose reception field intensity exceeds a predetermined level at a predetermined retransmission request return timing.

As described above, the embodiment of the present technology realizes a wireless communication method for performing retransmission control without recourse to the confirmation of reception. That is, where multiple data items are transmitted through frame aggregation, the destination device does not terminate its sequence by returning a confirmation of reception (ACK) upon receipt of the transmitted data. Where there exists undelivered data following the data reception, the destination device returns a retransmission request (NAQ) at a predetermined timing (time interval). If all data is received, the destination device does not return a retransmission request (NAQ). Upon elapse of a predetermined time period, the source device discards the data from its transmission buffer section.

If use is made of the communication sequences for aggregation destined for multiple devices, there are provided timings for the source device to receive multiple retransmission requests (NAQ). This makes it possible to efficiently receive retransmission requests (NAQ) from the multiple destination devices.

As described above, this embodiment allows the confirmation of reception (ACK) to be omitted following the data transmission if the status of transmission paths is satisfactory. This shortens the time required to return ACK and enables wireless transmission paths to be utilized efficiently.

In the transmission of aggregated data, the confirmation of reception (ACK) is not returned. This prevents all data from being retransmitted redundantly upon failure to receive the confirmation of reception (ACK). This practice improves the efficiency of transmission path utilization.

Where continuously aggregated data items are transmitted, the information about the data to be retransmitted may be described collectively in a retransmission request (NAQ). This simplifies the processing related to retransmission control.

With the transmitted data retained over a predetermined time period in which retransmission may take place, the data can be retransmitted even if the reception of a retransmission request fails.

Where aggregated data items are transmitted to multiple devices, there is no need to make a BACK request to each device or to exchange BACK individually therewith for confirmation of reception. The time required for the exchange is thus unnecessary, which improves the efficiency of transmission path utilization.

In returning a retransmission request (NAQ) for the aggregated data destined for multiple devices, each destination device may set its back-off time relative to the retransmission request (NAQ) return timing. This allows multiple destination devices to return their retransmission requests (NAQ) appropriately.

If retransmission requests (NAQ) overlap with one another when returned, the source device may retransmit all data. In this manner, the source device can perform retransmission effectively without retransmitting the undelivered data to specific individual devices.

On the basis of the Duration information included in the retransmission request (NAQ), peripheral devices may set the network allocation vector (NAV) in a manner preventing the retransmitted data items from colliding with each other while being received.

The dedicated frame type and frame subtype for identifying retransmission requests (NAQ) are provided. This enables the data exchanging sequence for returning only the undelivered data retransmission request (NAQ) to coexist with the existing data exchanging sequence for returning the confirmation of reception (ACK).

There are provided the frame types and subframe types for identifying new RTS and CTS frames apart from the existing RTS and CTS frames. This makes it possible to apply the communication protocol of this embodiment to existing wireless systems.

The information processing device 100 embodying the present technology may be used in conjunction with devices in diverse fields. For example, the information processing device 100 may be used in wireless devices employed on board a vehicle (e.g., car navigation system, smartphone). As another example, the information processing device 100 may be used in learning devices (e.g., tablet terminals) employed in the field of education. As a further example, the information processing device 100 may be used in wireless devices employed in the field of agriculture (e.g., terminals of a cattle management system). Likewise, the information processing device 100 may be used in wireless devices employed in such fields as sports and medical care.

2. Applications

The technology of the present disclosure may be applied to diverse products. For example, the information processing device 100 may be realized in the form of mobile terminals such as smartphones, tablet personal computers (PCs), laptop PCs, mobile game terminals, or digital cameras; fixed terminals such as TV sets, printers, digital scanners, or network storage; or onboard terminals such as car navigation systems. The information processing device 100 may also be realized as machine type communication (MTC) terminals that perform machine-to-machine (M2M) communication, such as smart meters, automatic vending machines, remote monitoring devices, or point-of-sale (POS) terminals. The information processing device 100 may further be realized in the form of a wireless communication module (e.g., an integrated circuit module made up of a single die) to be mounted in the above-mentioned terminals.

Alternatively, the information processing device 100 may be realized as a wireless LAN access point (also known as a wireless base station) that may or may not be provided with a router function. As another alternative, the information processing device 100 may be realized as a mobile wireless LAN router. As a further alternative, the information processing device 100 may be a wireless communication module (e.g., an integrated circuit module made up of a single die) to be mounted in such equipment.

2-1. First Application

Figure 21:
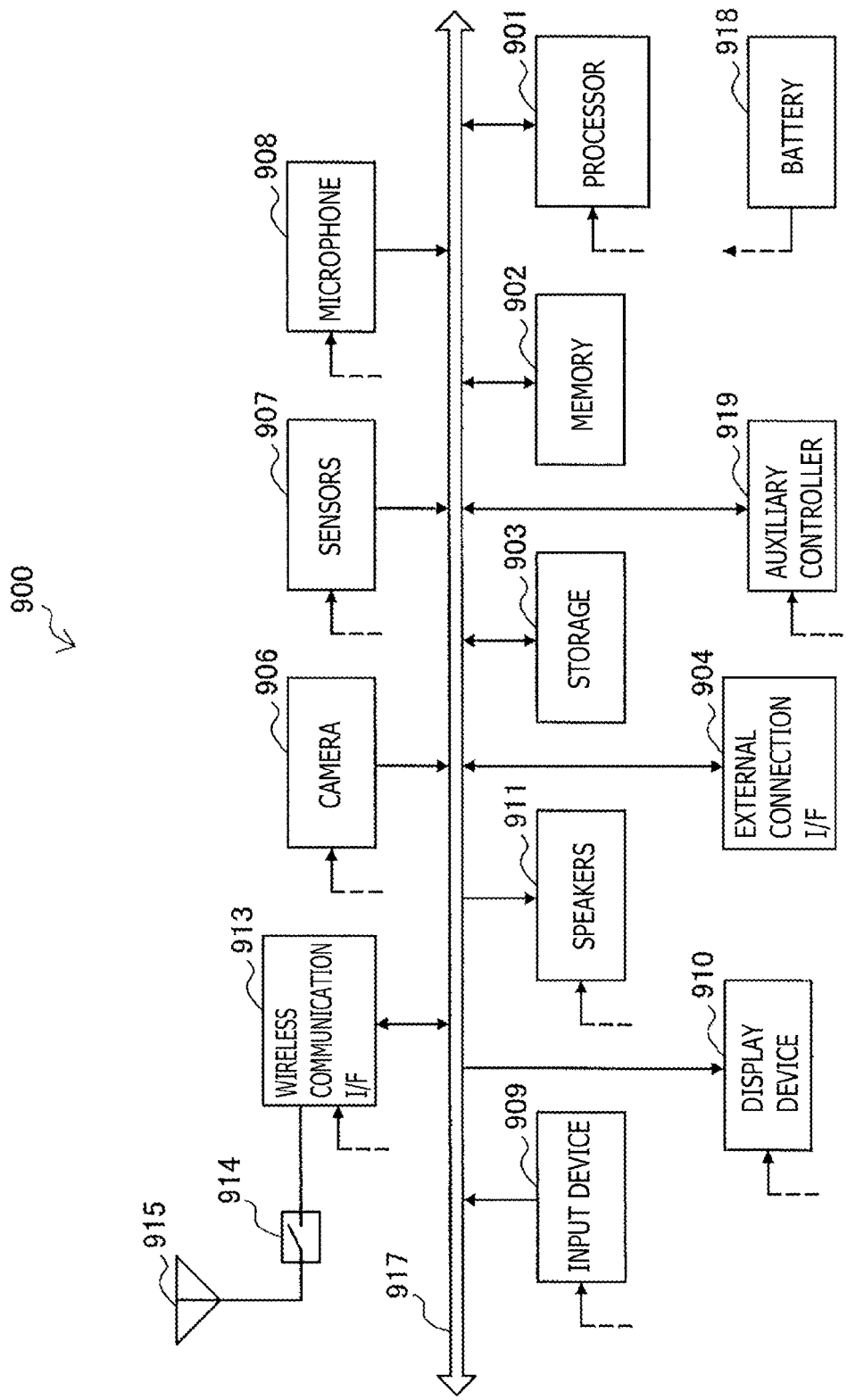
FIG. 21 is a block diagram depicting a schematic configuration example of a smartphone.

FIG. 21 is a block diagram depicting a schematic configuration example of a smartphone 900 to which the technology of the present disclosure may be applied. The smartphone 900 includes a processor 901, a memory 902, storage 903, an external connection interface 904, a camera 906, sensors 907, a microphone 908, an input device 909, a display device 910, speakers 911, a wireless communication interface 913, an antenna switch 914, an antenna 915, a bus 917, a battery 918, and an auxiliary controller 919.

The processor 901 may be a central processing unit (CPU) or a system on chip (SoC). The processor 901 controls the functions of the application layer and other layers of the smartphone 900. The memory 902 includes a random access memory (RAM) and a read-only memory (ROM) for storing data and the programs to be executed by the processor 901. The storage 903 may include storage media such as a semiconductor memory or a hard disk. The external connection interface 904 is an interface that connects an external device such as a memory card or a Universal Serial Bus (USB) device with the smartphone 900.

The camera 906 may have imaging elements such as charge-coupled devices (CCD) or complementary metal oxide semiconductors (CMOS) for generating captured images. The sensors 907 may include a group of sensors such as a positioning sensor, a gyro sensor, a geomagnetic sensor, and an acceleration sensor, for example. The microphone 908 converts the sound input to the smartphone 900 into an audio signal. The input device 909 includes a touch sensor that detects touches on a screen of the display device 910, a keypad, a keyboard, buttons, or switches for example, and receives operations or information input from the user. The display device 910 has a screen such as a liquid crystal display (LCD) or an organic light-emitting diode (OLED) display that displays images output from the smartphone 900. The speakers 911 convert an audio signal output from the smartphone 900 into sound.

The wireless communication interface 913 performs wireless communication by supporting at least one of the wireless LAN standards such as IEEE 802.11a, IEEE 802.11b, IEEE 802.11g, IEEE 802.11n, IEEE 802.11ac, and IEEE 802.11ad. In infrastructure mode, the wireless communication interface 913 can communicate with another device via a wireless LAN access point. In direct communication mode such as ad-hoc mode or Wi-Fi Direct mode, the wireless communication interface 913 can communicate directly with another device. In Wi-Fi Direct mode, unlike in ad-hoc mode, one of the two communicating terminals acts as an access point. Communication takes place directly between these terminals. Typically, the wireless communication interface 913 may include a baseband processor, a radio frequency (RF) circuit, and a power amplifier. The wireless communication interface 913 may be a one-chip module that integrates a memory for storing a communication control program, a processor for executing the program, and related circuits. In addition to the wireless LAN system, the wireless communication interface 913 may support other types of wireless communication systems such as near-field communication, close proximity communication system, or cellular communication. The antenna switch 914 switches the connection points of the antenna 915 to which to connect multiple circuits (e.g., for different wireless communication systems) included in the wireless communication interface 913. The antenna 915 has one or multiple antenna elements (e.g., those that make up a MIMO antenna), and is used by the wireless communication interface 913 for transmitting and receiving wireless signals.

The example in FIG. 21 is not limitative of how the smartphone 900 is configured. Alternatively, the smartphone 900 may have multiple antennas (e.g., one for wireless LAN, one for the close proximity communication system, etc.). In this case, the antenna switch 914 may be omitted from the configuration of the smartphone 900.

The bus 917 interconnects the processor 901, memory 902, storage 903, external connection interface 904, camera 906, sensors 907, microphone 908, input device 909, display device 910, speakers 911, wireless communication interface 913, and auxiliary controller 919. The battery 918 supplies power to the blocks of the smartphone 900 depicted in FIG. 21 via feeder lines indicated partially by broken lines in the drawing. The auxiliary controller 919 activates minimal functions of the smartphone 900 in sleep mode, for example.

In the smartphone 900 depicted in FIG. 21, the communication control section 240 discussed above with reference to FIG. 2 may be implemented using the wireless communication interface 913. At least part of the above-described functions may be implemented using the processor 901 or auxiliary controller 919.

The smartphone 900 may operate as a wireless access point (software AP) by getting the processor 901 to execute the access point function on the application level. Alternatively, the wireless communication interface 913 may include a wireless access point function.

2-2. Second Application

Figure 22:
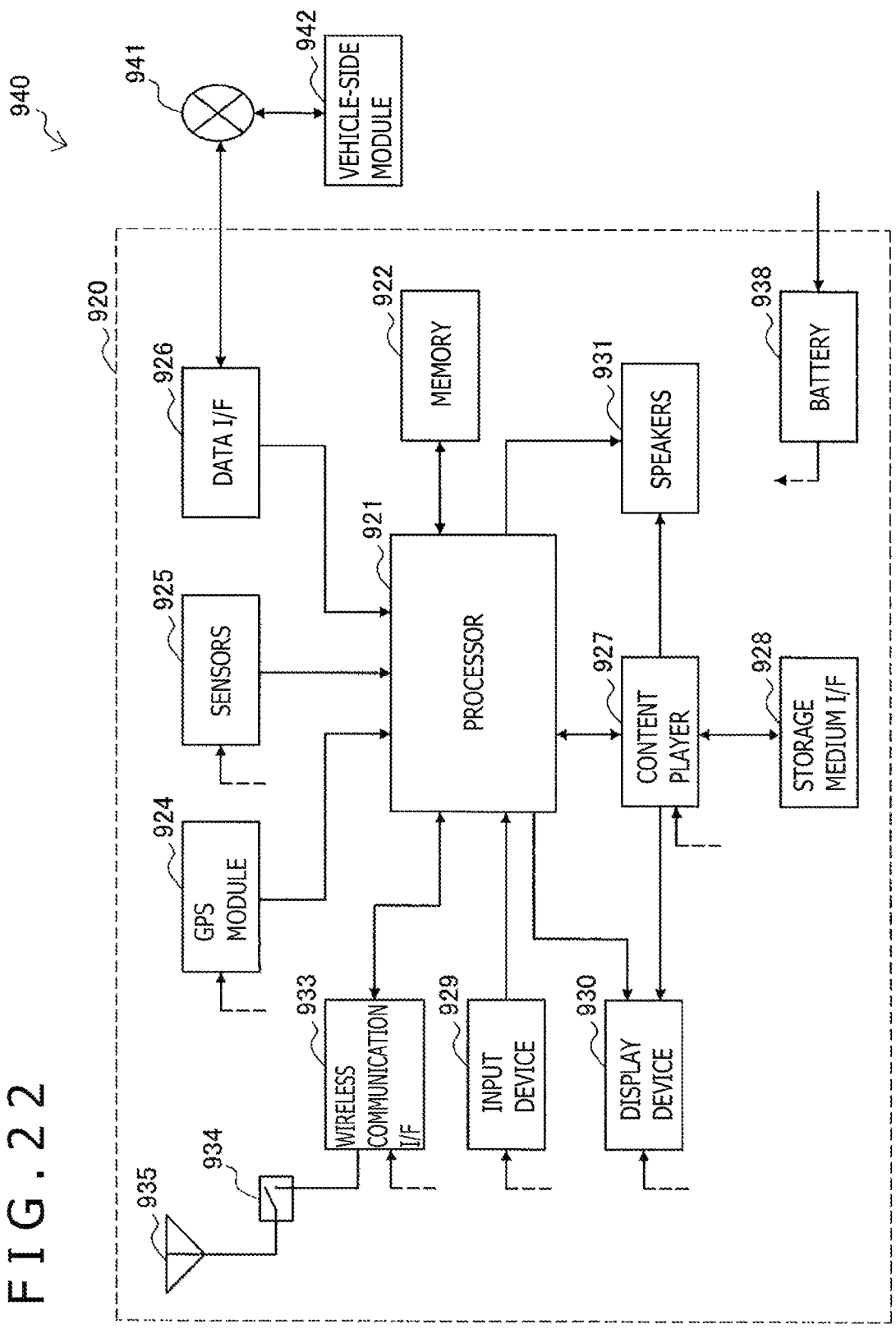
FIG. 22 is a block diagram depicting a schematic configuration example of a car navigation system.

FIG. 22 is a block diagram depicting a schematic configuration example of a car navigation system 920 to which the technology of the present disclosure may be applied. The car navigation system 920 includes a processor 921, a memory 922, a global positioning system (GPS) module 924, sensors 925, a data interface 926, a content player 927, a storage medium interface 928, an input device 929, a display device 930, speakers 931, a wireless communication interface 933, an antenna switch 934, an antenna 935, and a battery 938.

The processor 921 may be a CPU or an SoC, for example, which controls the navigation function and other functions of the car navigation system 920. The memory 922 includes a RAM and a ROM for storing data and the programs to be executed by the processor 921.

The GPS module 924 measures the position of the car navigation system 920 (e.g., in latitude, longitude, and altitude) using GPS signals received from GPS satellites. The sensors 925 may include a group of sensors such as a gyro sensor, a geomagnetic sensor, and an atmospheric pressure sensor. The data interface 926 is connected for example to an onboard network 941 via a terminal, not depicted, and acquires data such as velocity data generated on the side of the vehicle.

The content player 927 reproduces content stored on a storage medium (e.g., CD or DVD) loaded into the storage medium interface 928. The input device 929 includes a touch sensor that detects touches on a screen of the display device 930, buttons, or switches for example, and receives operations or information input from the user. The display device 930 has a screen such as an LCD or an OLED display that displays images from the navigation function or from the content being reproduced. The speakers 931 output sound from the navigation function or from the content being reproduced.

The wireless communication interface 933 performs wireless communication by supporting at least one of the wireless LAN standards such as IEEE 802.11a, IEEE 802.11b, IEEE 802.11g, IEEE 802.11n, IEEE 802.11ac, and IEEE 802.11ad. In infrastructure mode, the wireless communication interface 933 can communicate with another device via a wireless LAN access point. In direct communication mode such as ad-hoc mode or Wi-Fi Direct mode, the wireless communication interface 933 can communicate directly with another device. Typically, the wireless communication interface 933 may include a baseband processor, an RF circuit, and a power amplifier. The wireless communication interface 933 may be a one-chip module that integrates a memory for storing a communication control program, a processor for executing the program, and related circuits. In addition to the wireless LAN system, the wireless communication interface 933 may support other types of wireless communication systems such as near-field communication, close proximity communication system, or cellular communication. The antenna switch 934 switches the connection points of the antenna 935 to which to connect multiple circuits included in the wireless communication interface 933. The antenna 935 has one or multiple antenna elements and is used by the wireless communication interface 933 for transmitting and receiving wireless signals.

The example in FIG. 22 is not limitative of how the car navigation system 920 is configured. Alternatively, the car navigation system 920 may have multiple antennas. In this case, the antenna switch 934 may be omitted from the configuration of the car navigation system 920.

The battery 938 supplies power to the blocks of the car navigation system 920 depicted in FIG. 22 via feeder lines indicated partially by broken lines in the drawing. The battery 938 further stores power fed from the side of the vehicle.

In the car navigation system 920 depicted in FIG. 22, the communication control section 240 discussed above with reference to FIG. 2 may be implemented using the wireless communication interface 933. At least part of the above-described functions may be implemented using the processor 921.

The wireless communication interface 933 may operate as the above-described information processing device 100, providing wireless connection to the terminal held by the user riding in the vehicle.

The technology of the present disclosure may be implemented in the form of an onboard system (or vehicle) 940 including at least one block of the above-described car navigation system 920, the onboard network 941, and a vehicle-side module 942. The vehicle-side module 942 generates vehicle-side data such as engine revolutions or failure information and outputs the generated data onto the onboard network 941.

2-3. Third Application

Figure 23:
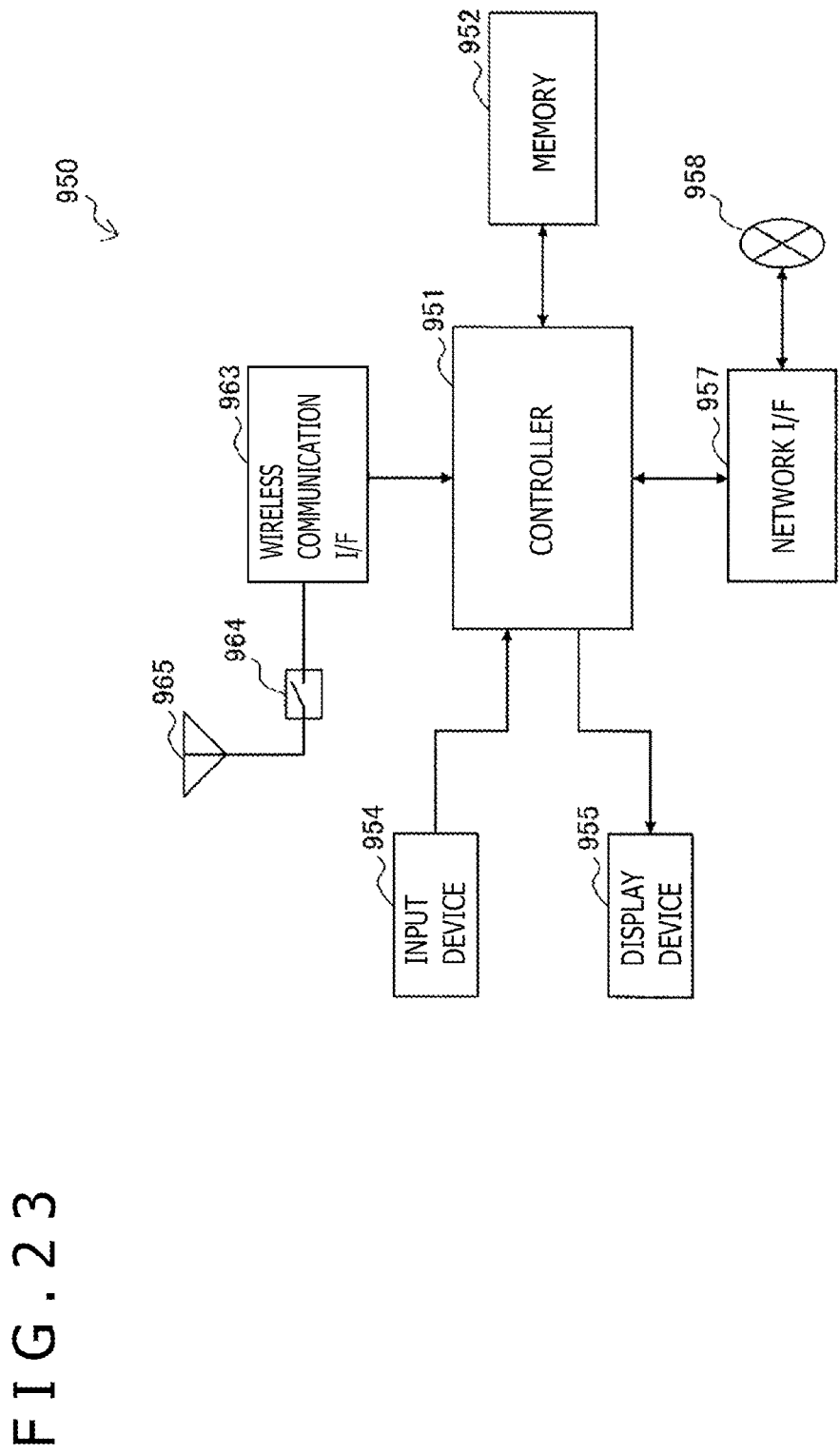
FIG. 23 is a block diagram depicting a schematic configuration example of a wireless access point.

FIG. 23 is a block diagram depicting a schematic configuration example of a wireless access point 950 to which the technology of the present disclosure may be applied. The wireless access point 950 includes a controller 951, a memory 952, an input device 954, a display device 955, a network interface 957, a wireless communication interface 963, an antenna switch 964, and an antenna 965.

The controller 951 may be a CPU or a digital signal processor (DSP), for example. The controller 951 activates the diverse functions of the Internet Protocol (IP) layer and upper layers of the wireless access point 950 (e.g., access restriction, routing, encryption, firewall, and log management). The memory 952 includes a RAM and a ROM and stores the programs to be executed by the controller 951 as well as various control data (e.g., terminal list, routing table, encryption keys, security settings, and logs).

The input device 954 includes buttons or switches for example, and receives operations made by the user. The display device 955 includes LED lamps displaying the operating status of the wireless access point 950.

The network interface 957 is a wired communication interface for connecting the wireless access point 950 to a wired communication network 958. The network interface 957 may include multiple connection terminals. The wired communication network 958 may be a LAN such as the Ethernet (registered trademark) or a wide area network (WAN).

The wireless communication interface 963 supports at least one of the wireless LAN standards such as IEEE 802.11a, IEEE 802.11b, IEEE 802.11g, IEEE 802.11n, IEEE 802.11ac, and IEEE 802.11ad. The wireless communication interface 963 acting as an access point provides wireless connection for nearby terminals. Typically, the wireless communication interface 963 may include a baseband processor, an RF circuit, and a power amplifier. The wireless communication interface 963 may be a one-chip module that integrates a memory for storing a communication control program, a processor for executing the program, and related circuits. The antenna switch 964 switches the connection points of the antenna 965 to which to connect multiple circuits included in the wireless communication interface 963. The antenna 965 has one or multiple antenna elements and is used by the wireless communication interface 963 for transmitting and receiving wireless signals.

In the wireless access point 950 depicted in FIG. 23, the communication control section 240 discussed above with reference to FIG. 2 may be implemented using the wireless communication interface 963. At least part of the above-described functions may be implemented using the controller 951.

The embodiments described above are merely examples in which the present technology may be implemented. The particulars of the embodiments correspond basically to the inventive matters claimed in the appended claims. Likewise, the inventive matters named in the appended claims correspond basically to the particulars of the embodiments with the same names in the foregoing description of the preferred embodiments of the present technology. However, these embodiments and other examples are not limitative of the present technology that may also be implemented using various modifications and alterations of the embodiments so far as they are within the scope of the appended claims.

The procedures discussed above in connection with the embodiments may be construed as constituting a method having a series of such procedures. Also, the procedures may be construed as forming a program for causing a computer to execute a series of such procedures, or as constituting a recording medium storing such a program. The recording medium may be a Compact Disc (CD), a MiniDisc (MD), a Digital Versatile Disc (DVD), a memory card, or a Blu-ray Disc (registered trademark), for example.

The advantageous effects mentioned in this description are only examples and not limitative of the present disclosure. Further advantages will become apparent from a reading of the present disclosure.

The present technology may be configured preferably as follows.

(1)

An information processing device including:

a control section configured in such a manner that if data destined for the own device is received from another device and if there exists undelivered data in the data, the control section transmits a retransmission request for the data to the other device and that if there exists no undelivered data in the data, the control section performs control not to transmit a confirmation of reception.

(2)

The information processing device as stated in paragraph (1) above in which, if there exists the undelivered data, the control section transmits a retransmission request for the undelivered data to the other device.

(3)

The information processing device as stated in paragraph (1) above in which, if first undelivered data constituting the undelivered data corresponding to the retransmission request is not transmitted from the other device following the transmission of the retransmission request, if new data destined for the own device is received from the other device, and if there exists undelivered data in the new data, the control section transmits to the other device a retransmission request for the new data including information about the first undelivered data.

(4)

The information processing device as stated in any one of paragraphs (1) to (3) above, in which the data destined for the own device has multiple data items combined by the other device to make up aggregated data, and if there exists undelivered data in the aggregated data, the control section transmits a retransmission request for part or all of the aggregated data to the other device.

(5)

The information processing device as stated in any one of paragraphs (1) to (4) above, in which the data destined for the own device has multiple data items combined by the other device to make up aggregated data, and the aggregated data is destined for multiple devices including the information processing device.

(6)

The information processing device as stated in paragraph (5) above, in which the control section sets a timing for transmitting the retransmission request to the other device in a manner backing off from a transmission timing of the retransmission request communicated from the other device.

(7)

The information processing device as stated in any one of paragraphs (1) to (6) above in which, even if a reception buffer section configured to hold data destined for the own device does not have at least a predetermined free space, the control section performs control to transmit the retransmission request to the other device.

(8)

The information processing device as stated in any one of paragraphs (1) to (7) above, in which the control section performs the control after verifying that the data destined for the own device is transmitted from the other device following exchange of a transmission request and a confirmation of transmission with the other device.

(9)

An information processing device including:

a control section configured in such a manner that if aggregated data combining multiple data items is transmitted to a destination device and if a retransmission request for the aggregated data is received from the destination device, the control section performs control to collectively transmit undelivered data in the data items corresponding to the retransmission request to the device.

(10)

The information processing device as stated in paragraph (9) above, in which the control section sets a transmission timing of the retransmission request to be transmitted from the device if undelivered data exists in the aggregated data, the control section communicating the transmission timing to the device using a transmission request to be transmitted to the device before the transmission of the aggregated data.

(11)

The information processing device as stated in paragraph (10) above in which, in transmitting the aggregated data to multiple devices, the control section sets the transmission timing of the retransmission request to be transmitted from the devices if there exists undelivered data in the aggregated data, on the basis of a number fewer than the number of the devices.

(12)

The information processing device as stated in paragraph (11) above in which, upon detecting a signal of which reception field intensity is higher than a threshold value at the transmission timing of the retransmission request, the control section performs control to retransmit all the aggregated data as the undelivered data.

(13)

The information processing device as stated in any one of paragraphs (10) to (12) above in which, even if the retransmission request is not received, the control section holds the aggregated data transmitted to the device over a time period predetermined on the basis of the transmission timing of the retransmission request.

(14)

The information processing device as stated in any one of paragraphs (9) to (13) above in which, if the retransmission request is not received, the control section transmits to the device other aggregated data to be transmitted thereto.

(15)

A communication system including:

a first information processing device; and a second information processing device, in which, if data destined for the second information processing device is transmitted thereto and if a retransmission request for the data is received from the second information processing device, the first information processing device collectively transmits undelivered data in the data corresponding to the retransmission request to the second information processing device, and if data destined for the own device is received from the first information processing device and if there exists undelivered data in the data, the second information processing device transmits a retransmission request for the data to the first information processing device, the second information processing device withholding transmission of a confirmation of reception if there exists no undelivered data in the data.

(16)

An information processing method including:

a procedure of performing control in such a manner that if data destined for an own device is received from another device and if there exists undelivered data in the data, a retransmission request for the data is transmitted to the other device and that if there exists no undelivered data in the data, a confirmation of reception is not transmitted.

(17)

An information processing method including:

a procedure of performing control in such a manner that if aggregated data combining multiple data items is transmitted to a destination device and if a retransmission request for the aggregated data is received from the destination device, undelivered data in the data items corresponding to the retransmission request are collectively transmitted to the device.

(18)

A program for causing a computer to perform control in such a manner that if data destined for an own device is received from another device and if there exists undelivered data in the data, a retransmission request for the data is transmitted to the other device and that if there exists no undelivered data in the data, a confirmation of reception is not transmitted.

REFERENCE SIGNS LIST

10 Communication system
100 to 103 Information processing device
110 Central processing section
120 User input section
130 User output section
140 Signal processing section
200 Wireless communication section
210 Interface
220 Transmission buffer section
230 Reception buffer section
240 Communication control section
241 Aggregation section
242 MU combination section
243 Timing control section
244 Access control section
245 NAQ analysis section
246 MU separation section
247 Data separation section
248 Control section
249 NAQ generation section
250 Wireless signal processing section
260 Antenna element control section
261 and 262 Antennas 270 Wireless signal analysis section
900 Smartphone
901 Processor
902 Memory
903 Storage
904 External connection interface
906 Camera
907 Sensors
908 Microphone
909 Input device
910 Display device
911 Speakers
913 Wireless communication interface
914 Antenna switch
915 Antenna
917 Bus
918 Battery
919 Auxiliary controller
920 Car navigation system
921 Processor
922 Memory
924 GPS module
925 Sensors
926 Data interface
927 Content player
928 Storage medium interface
929 Input device
930 Display device
931 Speakers
933 Wireless communication interface
934 Antenna switch
935 Antenna
938 Battery
941 Onboard network
942 Vehicle-side module
950 Wireless access point
951 Controller
952 Memory
954 Input device
955 Display device
957 Network interface
958 Wired communication network
963 Wireless communication interface
964 Antenna switch
965 Antenna

The invention claimed is:

1. An information processing device comprising:
processing circuitry configured to
receive, from another device, a transmission request regarding a transmission timing of a retransmission request, the transmission timing being set by the another device based on a number fewer than a number of a plurality of destination devices, including the information processing device, that receive aggregated data;
receive the aggregated data combining a plurality of data items from the another device;
determine whether there exists undelivered data in the received aggregated data;
perform control to transmit the retransmission request for the aggregated data to the another device at the transmission timing of the retransmission request indicated by the transmission request, in a case where it is determined that there exists the undelivered data in the received aggregated data; and
perform control not to transmit a confirmation of reception in a case where it is determined that there does not exist the undelivered data in the received aggregated data, wherein
the another device determines whether an energy level of detected signals, at the transmission timing of the retransmission request transmitted from at least one of the plurality of destination devices, is higher than a threshold reception field intensity value, and performs control to collectively retransmit all the aggregated data in a case where it is determined that the energy level of the detected signals is higher than the threshold reception field intensity value.

2. The information processing device according to claim 1, wherein
in a case where: first undelivered data constituting the undelivered data corresponding to the retransmission request is not transmitted from the another device following the transmission of the retransmission request; new data destined for the information processing device is received from the another device; and there exists undelivered data in the new data,
the processing circuitry transmits to the another device a retransmission request for the new data including information about the first undelivered data.

3. The information processing device according to claim 1, wherein
in a case where there exists the undelivered data in the aggregated data, the processing circuitry transmits the retransmission request for part or all of the aggregated data to the another device.

4. The information processing device according to claim 1, wherein the processing circuitry sets a timing for transmitting the retransmission request to the another device in a manner backing off from the transmission timing of the retransmission request communicated from the another device.

5. The information processing device according to claim 1, wherein, even in a case where a reception buffer memory of the information processing device for holding data does not have at least a predetermined free space, the processing circuitry performs control to transmit the retransmission request to the another device.

6. The information processing device according to claim 1, wherein the processing circuitry performs the control to transmit the retransmission request after verifying that the aggregated data is transmitted from the another device by receiving the transmission request from the another device and transmitting a confirmation of transmission to the another device.

7. An information processing device comprising:
processing circuitry configured to
set a transmission timing of a retransmission request to be transmitted from a plurality of destination devices, the retransmission request being transmitted in a case where undelivered data exists in aggregated data combining a plurality of data items to be transmitted to the plurality of destination devices, based on a number fewer than a number of the plurality of destination devices;
communicate the transmission timing to the plurality of destination devices using a transmission request to be transmitted to the plurality of destination devices before transmission of the aggregated data;
transmit the aggregated data combining the plurality of data items to the plurality of destination devices;

receive, from at least one of the plurality of destination devices, the retransmission request for the aggregated data;

determine whether an energy level of detected signals, at the transmission timing of the retransmission request transmitted from the at least one of the plurality of destination devices, is higher than a threshold reception field intensity value; and in a case where it is determined that the energy level of the detected signals is higher than the threshold reception field intensity value, perform control to collectively retransmit all the aggregated data as undelivered data in the plurality of data items corresponding to the retransmission request to the at least one of the plurality of destination devices in response to receiving the retransmission request for the aggregated data, the retransmission request including information on the undelivered data, and the retransmitted undelivered data corresponding to data identified by the information on the undelivered data.

8. The information processing device according to claim 7, wherein, even in a case where the retransmission request is not received, the processing circuitry holds the aggregated data transmitted to the plurality of destination devices over a time period predetermined on the basis of the transmission timing of the retransmission request.

9. The information processing device according to claim 7, wherein, in a case where the retransmission request is not received, the processing circuitry transmits to the plurality of destination devices other aggregated data to be transmitted thereto.

10. A communication system comprising:
a first information processing device including first processing circuitry; and
a second information processing device including second processing circuitry, wherein
the first processing circuitry is configured to
set a transmission timing of a retransmission request to be transmitted from a plurality of destination devices including the second information processing device, the retransmission request being transmitted in a case where undelivered data exists in aggregated data combining a plurality of data items to be transmitted to the plurality of destination devices, based on a number fewer than a number of the plurality of destination devices;

communicate the transmission timing to the plurality of destination devices using a transmission request to be transmitted to the plurality of destination devices before transmission of the aggregated data;

transmit the aggregated data combining the plurality of data items to the plurality of destination devices;

receive, from at least one of the plurality of destination devices, the retransmission request for the aggregated data;

determine whether an energy level of detected signals, at the transmission timing of the retransmission request transmitted from the at least one of the plurality of destination devices, is higher than a threshold reception field intensity value; and in a case where it is determined that the energy level of the detected signals is higher than the threshold reception field intensity value, perform control to collectively retransmit all the aggregated data as undelivered data in the plurality of data items corresponding to the retransmission request to the at least one of the plurality of destination devices in response to receiving the retransmission request for the aggregated data, the retransmission request including information on the undelivered data, and the retransmitted undelivered data corresponding to data identified by the information on the undelivered data, and the second processing circuitry is configured to
receive, from the first information processing device, the transmission request regarding the transmission timing of the retransmission request receive the aggregated data from the first information processing device;

determine whether there exists undelivered data in the received aggregated data;

perform control to transmit the retransmission request for the aggregated data to the first information processing device at the transmission timing indicated by the transmission request, in a case where it is determined that there exists the undelivered data in the received aggregated data; and perform control not to transmit a confirmation of reception in a case where it is determined that there does not exist the undelivered data in the received aggregated data.

* * * * *